(12) United States Patent
Fujimoto et al.

(10) Patent No.: US 11,559,062 B2
(45) Date of Patent: *Jan. 24, 2023

(54) INSIDE AIR CONTROL APPARATUS AND CONTAINER REFRIGERATION APPARATUS INCLUDING THE SAME

(71) Applicant: DAIKIN INDUSTRIES, LTD., Osaka (JP)

(72) Inventors: Yuusuke Fujimoto, Osaka (JP); Noritaka Kamei, Osaka (JP)

(73) Assignee: Daikin Industries, LTD., Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/002,457

(22) Filed: Aug. 25, 2020

(65) Prior Publication Data

US 2020/0383342 A1    Dec. 10, 2020

Related U.S. Application Data

(63) Continuation of application No. PCT/JP2019/006405, filed on Feb. 20, 2019.

(30) Foreign Application Priority Data

Feb. 27, 2018    (JP) .............................. JP2018-033915

(51) Int. Cl.
*A23B 7/148* (2006.01)
*A01N 3/00* (2006.01)
(Continued)

(52) U.S. Cl.
CPC ............... *A23B 7/148* (2013.01); *A01N 3/00* (2013.01); *A23L 3/001* (2013.01); *A23L 3/3418* (2013.01); *F25D 11/00* (2013.01); *A23V 2002/00* (2013.01)

(58) Field of Classification Search
CPC ........ A47J 9/006; A47J 27/086; A47J 27/092; A47J 27/62; A47J 27/64; A47J 29/04;
(Continued)

(56) References Cited

U.S. PATENT DOCUMENTS 4,142,372 A * 3/1979 Kato .................... A23B 7/148
62/78
4,642,996 A * 2/1987 Harris .................. B60H 3/0007
62/78
(Continued)

FOREIGN PATENT DOCUMENTS

JP    1-179622 A    7/1989
JP    5-503427 A    6/1993
(Continued)

OTHER PUBLICATIONS

International Preliminary Report on Patentability and English translation of the Written Opinion of the International Searching Authority, dated Sep. 3, 2020, for International Application No. PCT/JP2019/006405.
(Continued)

*Primary Examiner* — Thien S Tran
(74) *Attorney, Agent, or Firm* — Birch, Stewart, Kolasch & Birch, LLP

(57) ABSTRACT

An inside air control apparatus includes: a gas supply device that performs a gas supply operation for supplying low oxygen concentration air into a container; and a controller that controls an operation of the gas supply device so that the inside air has desired composition. The controller is configured to be able to execute, if an oxygen concentration of the inside air is higher than a target oxygen concentration, a carbon dioxide concentration controlling operation for controlling composition of the inside air to be desired composition by causing the gas supply device to perform the gas supply operation, while allowing the gas supply device to
(Continued)

change the amount of gas supply such that the carbon dioxide concentration of the inside air falls within a predetermined reference concentration range.

12 Claims, 15 Drawing Sheets

(51) Int. Cl.
*A23L 3/00* (2006.01)
*A23L 3/3418* (2006.01)
*F25D 11/00* (2006.01)

(58) Field of Classification Search
CPC ........ A47J 31/047; A47J 36/32; A47J 36/321;
A47J 37/04; A47J 37/1228; A47J 42/44;
F25D 29/003; F25D 11/00; F25D 17/042;
F25D 23/00; F25D 17/04; F25D 29/00;
F25D 3/105; F25D 11/003; F25D 17/06;
A23L 3/3418; A23L 3/001; A23L 3/3427;
A23L 3/3481; A23L 3/3409; A23L 3/363;
A23L 3/3445; A01N 3/00; A23B 7/148;
A23B 7/04; A23B 7/152; A23B 7/144;
A23B 9/18; A23V 2/00; A10F 25/14;
A10F 2025/147; A10F 25/00; B01D
53/047; B01D 2253/108; B01D 2256/10;
B01D 2257/102; B01D 2257/104; B01D
2257/80; B01D 2259/40007; B01D
2259/40009; B01D 2259/402; B01D
2259/4566; B01D 53/0473; B01D
2253/25; B01D 2253/116; B01D 53/22;
B01D 53/30; A01G 7/02; G01N 33/004;
G01N 33/0006; Y02A 50/20; Y02A
50/244; B65D 88/745; B65D 2588/746;
B65D 88/74; B60P 3/20; G05D 23/1902;
G05D 21/02; Y10S 62/908; Y02C 20/40;
B01J 19/14; F24F 11/30; F24F 2110/76;
F24F 2110/70; Y02B 30/70; A61L 2/202;
C01B 13/11; C01B 13/10
USPC ...... 99/468, 467, 472, 473, 474; 702/22, 23,
702/24, 27, 30–32, 50, 85, 104, 107, 116,
702/127, 176, 178, 179, 181, 182, 183,
702/188, 189, 204, 401, 406; 62/78, 384,
62/388, 239, 179, 48.1, 89, 91, 176.6,
62/176.1, 176.4, 176.3, 216, 51.1, 514,
62/126, 127, 178, 131, 414, 419, 329, 1,
62/18, 93, 94, 46.3, 46.2, 53.2, 62, 151,
62/180, 186, 240, 229, 230; 426/418,
426/419, 312, 231, 320, 314, 118, 232;
55/16, 158, 58, 59, 62, 74, 179, 387;
236/44 R, 44 C, 44 B, 44 A, 91 C, 46 R,
236/78 D; 364/184, 556, 557, 418, 510;
98/6, 36; 165/21, 32, 62, 63; 9/468,
9/474, 475, 40; 422/3, 4, 25, 40, 83, 112,
422/255, 305; 73/1.07, 1 G, 23.3, 19.01,
73/31.5; 700/214
See application file for complete search history.

(56) References Cited

U.S. PATENT DOCUMENTS

| | | | | |
|---|---|---|---|---|
| 4,710,206 A | * | 12/1987 | Allen | B01D 53/0476 95/97 |
| 4,817,391 A | * | 4/1989 | Roe | A23B 7/148 62/624 |
| 4,829,774 A | * | 5/1989 | Wassibauer | A23L 3/363 62/78 |
| 4,833,892 A | * | 5/1989 | Wassibauer | A23L 3/3418 62/216 |
| 4,843,956 A | * | 7/1989 | Lashlee | A23B 7/144 99/468 |
| 4,987,745 A | * | 1/1991 | Harris | A23L 3/3418 62/78 |
| 5,451,248 A | * | 9/1995 | Sadkowski | A23B 7/144 426/419 |
| 5,457,963 A | * | 10/1995 | Cahill-O'Brien | G05D 21/02 62/78 |
| 5,872,721 A | * | 2/1999 | Huston | A23B 7/148 702/24 |
| 7,089,751 B2 | * | 8/2006 | Fleming, Jr. | F25D 17/042 62/78 |
| 2013/0019961 A1 | * | 1/2013 | Rogers | F25D 17/042 137/334 |
| 2014/0202183 A1 | * | 7/2014 | Chadwick | A23L 3/3418 62/78 |
| 2016/0245555 A1 | * | 8/2016 | Tanaka | F25D 17/042 |
| 2017/0112171 A1 | * | 4/2017 | Cermak | B01D 53/22 |
| 2018/0235247 A1 | | 8/2018 | Kamei et al. | |
| 2019/0141903 A1 | | 5/2019 | Takayama | |

FOREIGN PATENT DOCUMENTS

| | | |
|---|---|---|
| JP | 2017-44452 A | 3/2017 |
| JP | 2017-190935 A | 10/2017 |
| WO | WO 91/11913 A1 | 8/1991 |

OTHER PUBLICATIONS

Extended European Search Report for European Application No. 19760821.9, dated Mar. 19, 2021.

* cited by examiner

FIG.8

TIMING OF VALVE SWITCHING AND STATES IN ADSORPTION COLUMNS

| OPERATION | FIRST OPERATION | PRESSURE EQUALIZATION OPERATION | SECOND OPERATION | PRESSURE EQUALIZATION OPERATION |
|---|---|---|---|---|
| FIRST DIRECTIONAL CONTROL VALVE | FIRST STATE | | SECOND STATE | FIRST STATE |
| SECOND DIRECTIONAL CONTROL VALVE | FIRST STATE | | SECOND STATE | |
| FIRST ADSORPTION COLUMN | PRESSURIZED/ADSORB | PRESSURIZED/ADSORB | DEPRESSURIZED/DESORB | PRESSURIZED/ADSORB |
| SECOND ADSORPTION COLUMN | DEPRESSURIZED/DESORB | PRESSURIZED/ADSORB | PRESSURIZED/ADSORB | PRESSURIZED/ADSORB |

FIG.9

| OPERATION | FIRST OPERATION | | PRESSURE EQUALIZATION OPERATION | SECOND OPERATION | | PRESSURE EQUALIZATION OPERATION |
|---|---|---|---|---|---|---|
| EXHAUST ON-OFF VALVE | OPEN | | CLOSE | OPEN | | CLOSE |
| SUPPLY ON-OFF VALVE | CLOSE | | OPEN | CLOSE | | OPEN |
| LOW OXYGEN CONCENTRATION AIR | EXHAUST | | SUPPLY | EXHAUST | | SUPPLY |
| | ←t→ | | | ←t→ | | |

C0 : INITIAL CONCENTRATION
C1 : STARTING CONCENTRATION
X : ALLOWABLE CONCENTRATION
$SPCO_2$ : TARGET CARBON DIOXIDE CONCENTRATION
$X + \alpha$ : FIRST LOW CONCENTRATION
$SPCO_2 + \alpha$ : FIRST HIGH CONCENTRATION
A : REFERENCE CONCENTRATION RANGE $$\left[ \begin{array}{l} C1 = C0 - \alpha \\ X \leqq C1 \leqq SPCO_2 \end{array} \right.$$

$$C1 + \alpha \leqq A \leqq C1 + \beta$$

A : REFERENCE CONCENTRATION RANGE
$A_{min}$ : LOWER LIMIT OF REFERENCE CONCENTRATION RANGE
$A_{max}$ : UPPER LIMIT OF REFERENCE CONCENTRATION RANGE
$Y_1$ : SECOND LOW CONCENTRATION
$Y_2$ : SECOND HIGH CONCENTRATION

FIG.13

| | $A_{min}$ | $A_{max}$ | $Y_1$ | $Y_2$ |
|---|---|---|---|---|
| ① | $SPCO_2 + \alpha$ | $SPCO_2 + \beta$ | $SPCO_2$ | $SPCO_2 + \gamma$ |
| ② | C0 | C0 − $\alpha$ + $\beta$ | C0 − $\alpha$ | C0 − $\alpha$ + $\gamma$ |
| ③ | C0 | C0 − $\alpha$ + $\beta$ | C0 − $\alpha$ | $SPCO_2$ |
| ④ | X + $\alpha$ | X + $\beta$ | X | $SPCO_2$ |

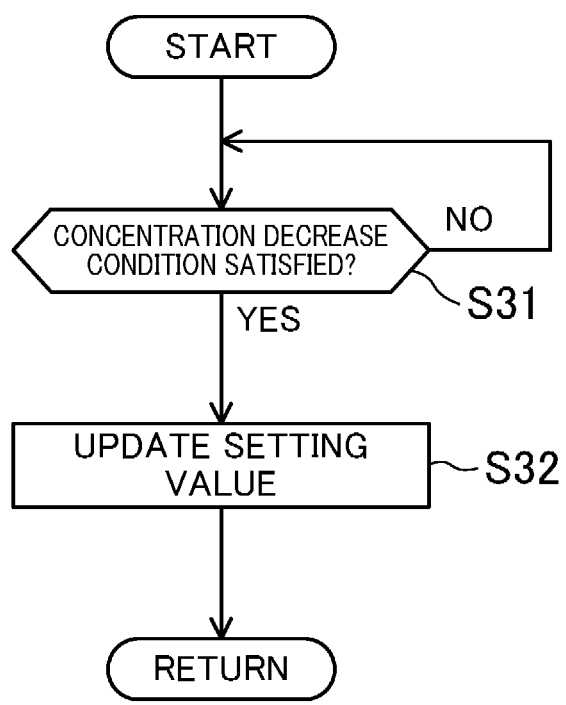

INSIDE AIR CONTROL APPARATUS AND CONTAINER REFRIGERATION APPARATUS INCLUDING THE SAME

CROSS REFERENCE TO RELATED APPLICATIONS

This application is a Continuation of PCT International Application No. PCT/JP2019/006405, filed on Feb. 20, 2019, which claims priority under 35 U.S.C. 119(a) to Patent Application No. 2018-033915, filed in Japan on Feb. 27, 2018, all of which are hereby expressly incorporated by reference into the present application.

TECHNICAL FIELD

The present disclosure relates to an inside air control apparatus and a container refrigeration apparatus including the same.

BACKGROUND ART

There has been proposed a technique for controlling the composition of air in a storage containing plants, such as fruits and vegetables, to be composition suitable for keeping the plants fresh.

Patent Document 1 discloses an inside air control apparatus that controls the air in a storage containing plants, such as blueberries and asparaguses, which are preferably stored in an environment with a low oxygen concentration and a relatively high carbon dioxide concentration to keep them fresh.

According to Patent Document 1, the inside air control apparatus is provided for the storage. The inside air control apparatus includes a gas supply device that performs a gas supply operation for supplying low oxygen concentration air having a higher nitrogen concentration and lower oxygen concentration than the air into the container, and an exhaust portion that exhausts the air out of the storage. In Patent Document 1, carbon dioxide priority control is performed. Specifically, after carbon dioxide is introduced into the storage in advance, the inside air control apparatus performs the gas supply operation to substitute the inside air into the low oxygen concentration air in order to lower the oxygen concentration of the inside air, and stops the gas supply operation if the carbon dioxide concentration of the inside air is lowered to a critical concentration which is lower than a target carbon dioxide concentration through the gas supply operation. Further, if the carbon dioxide concentration of the inside air reaches a resuming concentration which is higher than the target carbon dioxide concentration through the breathing of the plants, the gas supply operation is resumed to lower the oxygen concentration of the inside air again. Through this carbon dioxide priority control, the oxygen concentration is lowered while maintaining the carbon dioxide concentration of the inside air around the target carbon dioxide concentration.

CITATION LIST

Patent Document

Patent Document 1: Japanese Unexamined Patent Publication No. 2017-190935

SUMMARY

A first aspect of the present disclosure is directed to an inside air control apparatus including: a gas supply device (30) that performs a gas supply operation for supplying low oxygen concentration air that is produced through reduction of oxygen from outside air and has a lower oxygen concentration than the outside air into a storage (11) storing breathing plants (15); and a controller (55) that controls an operation of the gas supply device (30) such that inside air of the storage (11) has desired composition. The gas supply device (30) is configured to be able to change an amount of gas supply into the storage (11) through the gas supply operation in a plurality of stages such that the oxygen concentration of the low oxygen concentration air supplied into the storage decreases with a decrease in the amount of gas supply. The controller (55) is configured to be able to execute, if the oxygen concentration of the inside air is higher than a target oxygen concentration, a carbon dioxide concentration controlling operation for lowering an oxygen concentration of the inside air to the target oxygen concentration by causing the gas supply device (30) to perform the gas supply operation, while allowing the gas supply device (30) to change the amount of gas supply in accordance with a carbon dioxide concentration of the inside air such that the carbon dioxide concentration of the inside air falls within a predetermined reference concentration range.

BRIEF DESCRIPTION OF THE DRAWINGS

FIG. 8 is a timing chart illustrating timing of valve switching and states in adsorption columns in a gas production operation of a gas supply device of the first embodiment.

FIG. 9 is a timing chart illustrating timing of valve switching in a gas supply mode of the gas supply device of the first embodiment.

FIG. 13 is a table illustrating thresholds corresponding to four initial concentration ranges, the thresholds being used for the increasing control and the reducing control in the carbon dioxide concentration controlling operation of the first embodiment.

FIG. 16 is a control flow of update control when the concentration decreases after gas introduction in the carbon dioxide concentration controlling operation of the first embodiment.

DESCRIPTION OF EMBODIMENTS

Embodiments will be described with reference to the drawings.

First Embodiment

Figure 1:
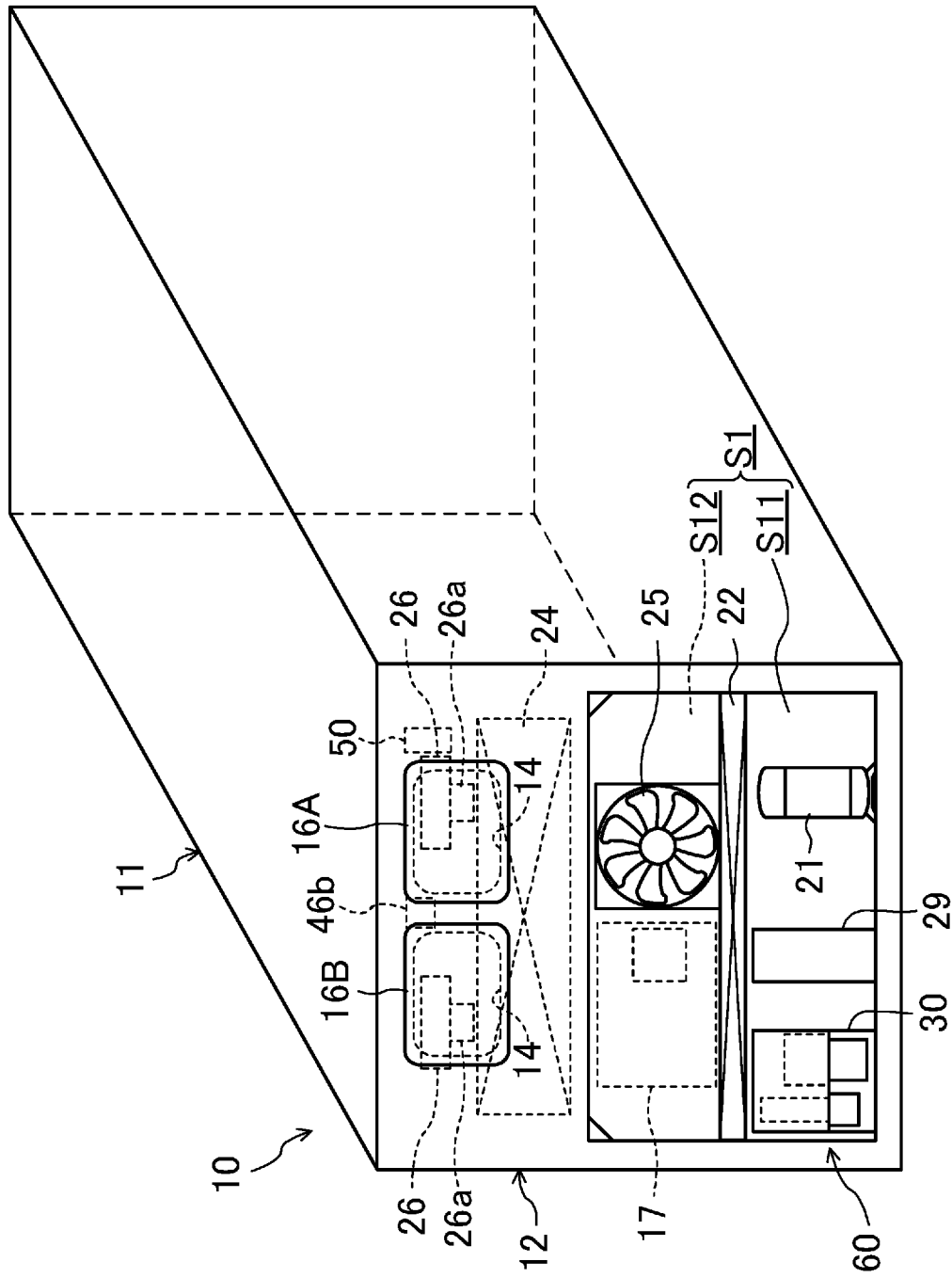
FIG. 1 is a perspective view illustrating a container refrigeration apparatus of a first embodiment as viewed from outside.
Figure 2:
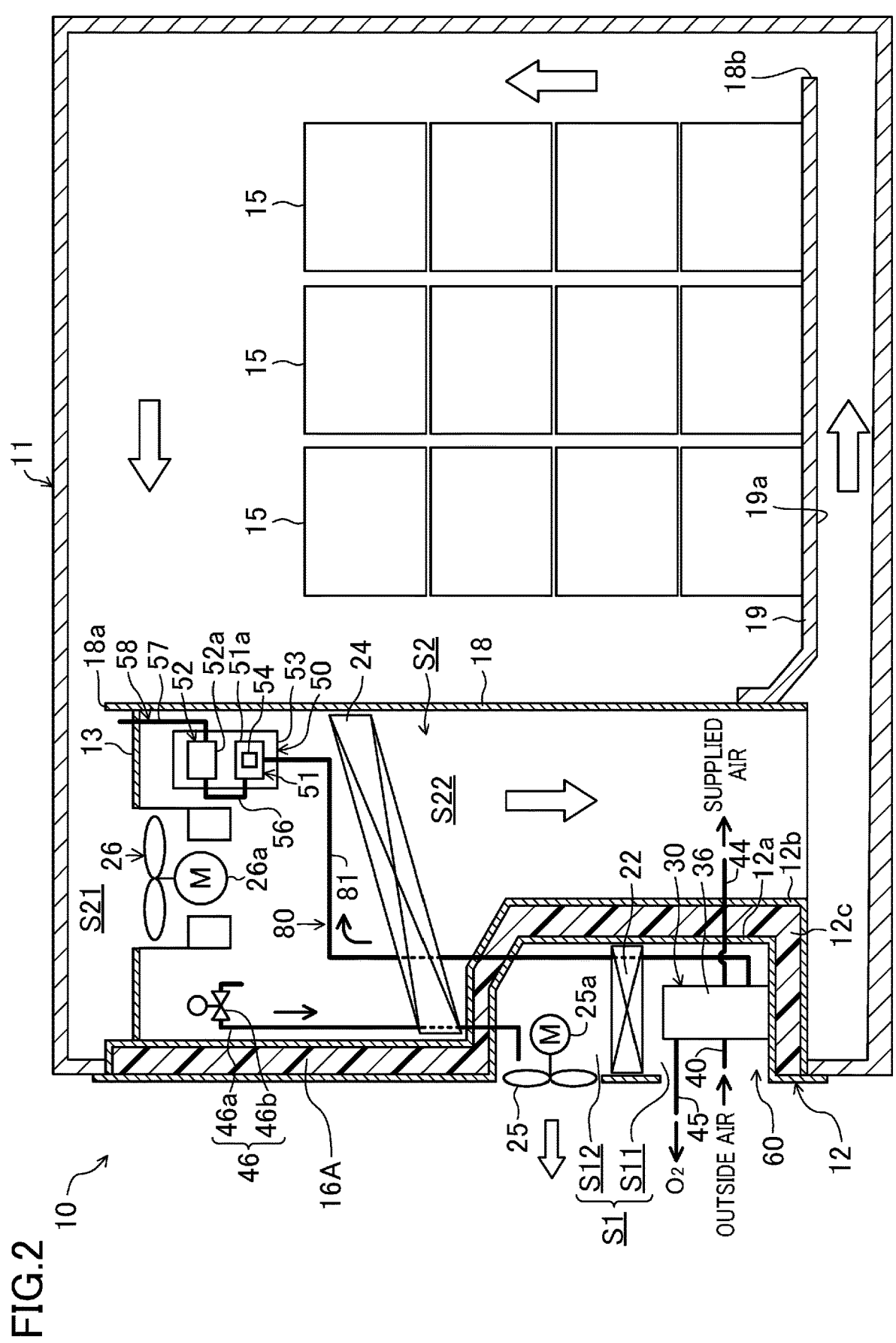
FIG. 2 is a cross-sectional view illustrating a general configuration of the container refrigeration apparatus of the first embodiment.

As shown in FIGS. 1 and 2, a container refrigeration apparatus (10) is provided for a container (11) for use in, e.g., marine transportation, and cools the air in the container (11). Boxed plants (15) are stored in the container (11). The plants (15) breathe by absorbing oxygen ($O_2$) in the air and releasing carbon dioxide ($CO_2$) into the air, and examples of such plants (15) include fruit like bananas and avocados, vegetables, cereals, bulbous plants, and natural flowers.

The container (11) has the shape of an elongate box with an open end surface. The container refrigeration apparatus (10) includes a casing (12), a refrigerant circuit (20) shown in FIG. 3, and an inside air control apparatus (controlled atmosphere system) (60), and is attached to close the open end of the container (11).

<Casing>

As shown in FIG. 2, the casing (12) includes an exterior wall (12a) disposed outside the container (11), and an interior wall (12b) disposed inside the container (11). The exterior and interior walls (12a) and (12b) may be made of an aluminum alloy, for example.

The exterior wall (12a) is attached to the periphery of the opening of the container (11) so as to close the open end of the container (11). The exterior wall (12a) is formed such that the lower part of the exterior wall (12a) protrudes into the container (11).

The interior wall (12b) is disposed to face the exterior wall (12a). The interior wall (12b) protrudes into the container just like the lower part of the exterior wall (12a). A thermal insulator (12c) fills the space between the interior and exterior walls (12b) and (12a).

As can be seen, the lower part of the casing (12) is formed so as to protrude into the container (11). Thus, an external storage space (S1) is formed outside the container (11) and in the lower part of the casing (12), and an internal storage space (S2) is formed inside the container (11) and in the upper part of the casing (12).

As shown in FIG. 1, the casing (12) includes two access openings (14) for maintenance arranged side by side in a width direction of the casing. The two access openings (14) are closed respectively by first and second access doors (16A, 16B) which are openable and closable. Each of the first and second access doors (16A, 16B) includes, just like the casing (12), an exterior wall, an interior wall, and a thermal insulator.

As shown in FIG. 2, a partition plate (18) is disposed in the interior of the container (11). This partition plate (18) is formed in the shape of a substantially rectangular plate member, and stands upright so as to face the wall of the casing (12) inside the container (11). This partition plate (18) separates the internal storage space (S2) from the interior of the container (11).

A suction port (18a) is formed between the upper end of the partition plate (18) and a ceiling surface of the container (11). Air in the container (11) is taken into the internal storage space (S2) through the suction port (18a).

The internal storage space (S2) is further provided with a partition wall (13) extending in the horizontal direction. The partition wall (13) is attached to an upper end portion of the partition plate (18), and has an opening in which internal fans (26), which will be described later, are disposed. This partition wall (13) partitions the internal storage space (S2) into a primary space (S21) on the suction side of the internal fans (26), and a secondary space (S22) on the blowout side of the internal fans (26). In this embodiment, the partition wall (13) divides the internal storage space (S2) horizontally such that the primary space (S21) on the suction side is disposed above the secondary space (S22) on the blowout side.

A floor plate (19) is disposed in the container (11) with a gap left between the floor plate (19) and the bottom surface of the container (11). Boxed plants (15) are placed on the floor plate (19). An underfloor path (19a) is formed between the floor plate (19) and the bottom surface of the container (11). A gap is left between the lower end of the partition plate (18) and the bottom surface of the container (11), and communicates with the underfloor path (19a).

A blowout port (18b) through which the air that has been cooled by the container refrigeration apparatus (10) is blown into the container (11) is provided at an end of the floor plate (19) opposite from the open end of the container (11) (on the right side in FIG. 2).

<Configuration and Arrangement of Refrigerant Circuit and Other Components>

Figure 3:
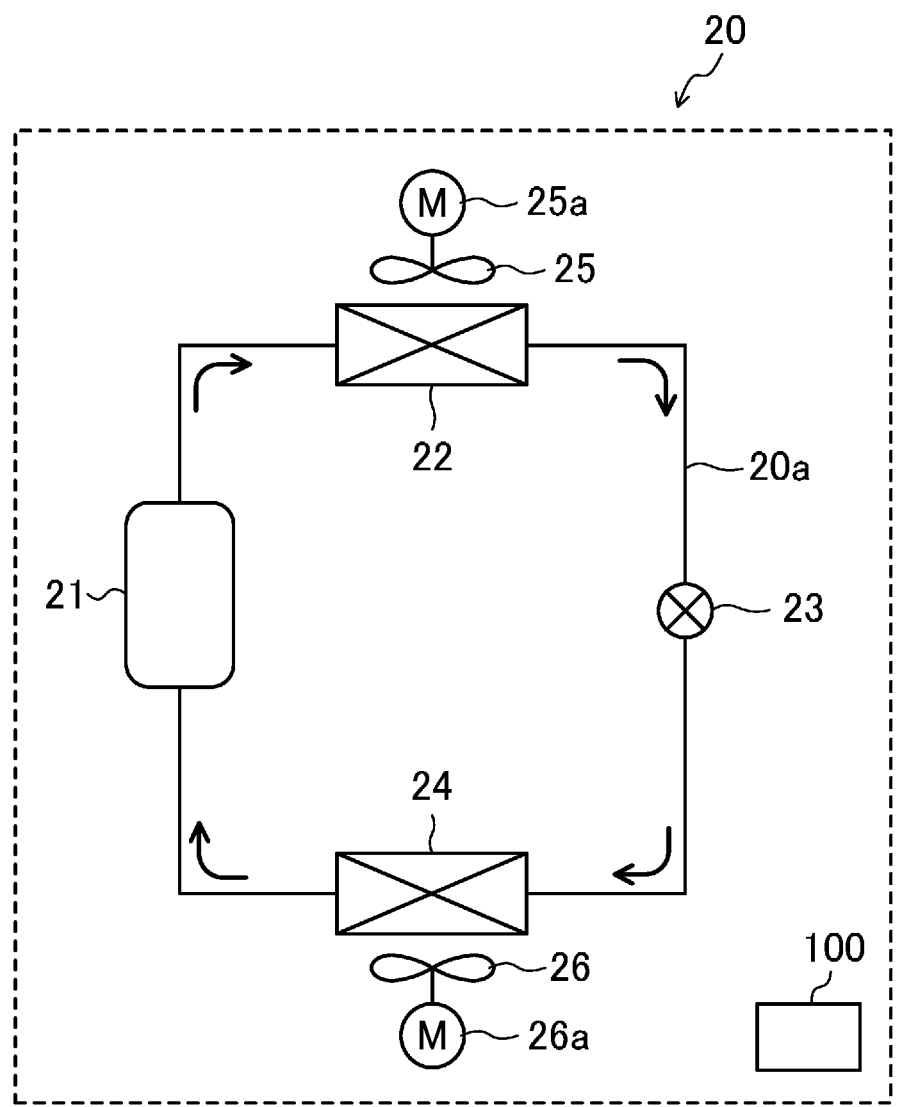
FIG. 3 is a piping system diagram illustrating a configuration of a refrigerant circuit of the first embodiment.

As shown in FIG. 3, the refrigerant circuit (20) is a closed circuit in which a compressor (21), a condenser (22), an expansion valve (23), and an evaporator (24) are connected together in this order by a refrigerant pipe (20a).

An external fan (25) is disposed near the condenser (22), and is driven in rotation by an external fan motor (25a) to guide the air in the external space of the container (11) (i.e., outside air) into the external storage space (S1), and send it to the condenser (22). In the condenser (22), heat is exchanged between a refrigerant compressed in the compressor (21) and flowing through the condenser (22) and the outside air sent to the condenser (22) by the external fan (25). In this embodiment, the external fan (25) is comprised of a propeller fan.

Two internal fans (26) (see FIG. 1) are disposed near the evaporator (24), and are driven in rotation by internal fan motors (26a) to guide the air in the container (11) through the suction port (18a), and blow the air toward the evaporator (24). In the evaporator (24), heat is exchanged between the refrigerant decompressed by the expansion valve (23) and flowing through the evaporator (24) and the inside air sent to the evaporator (24) by the internal fans (26).

As shown in FIG. 1, the compressor (21) and the condenser (22) are housed in the external storage space (S1). The condenser (22), located in the middle of the external storage space (S1) in the vertical direction, divides the external storage space (S1) into a lower first space (S11) and an upper second space (S12). In the first space (S11), the compressor (21), an inverter box (29) which houses a driver circuit for driving the compressor (21) at a variable velocity, and a gas supply device (30) of the inside air control apparatus (60) are disposed. The external fan (25) and an electric component box (17) are disposed in the second space (S12). The first space (S11) is open toward the external space of the container (11). The second space (S12) is closed from the external space by a plate member such that only a blowout port of the external fan (25) is open toward the external space.

As shown in FIG. 2, the evaporator (24) is housed in the secondary space (S22) of the internal storage space (S2). The two internal fans (26) are disposed above the evaporator (24) in the internal storage space (S2) and arranged side by side in the width direction of the casing (12).

<Inside Air Control Apparatus>

Figure 4:
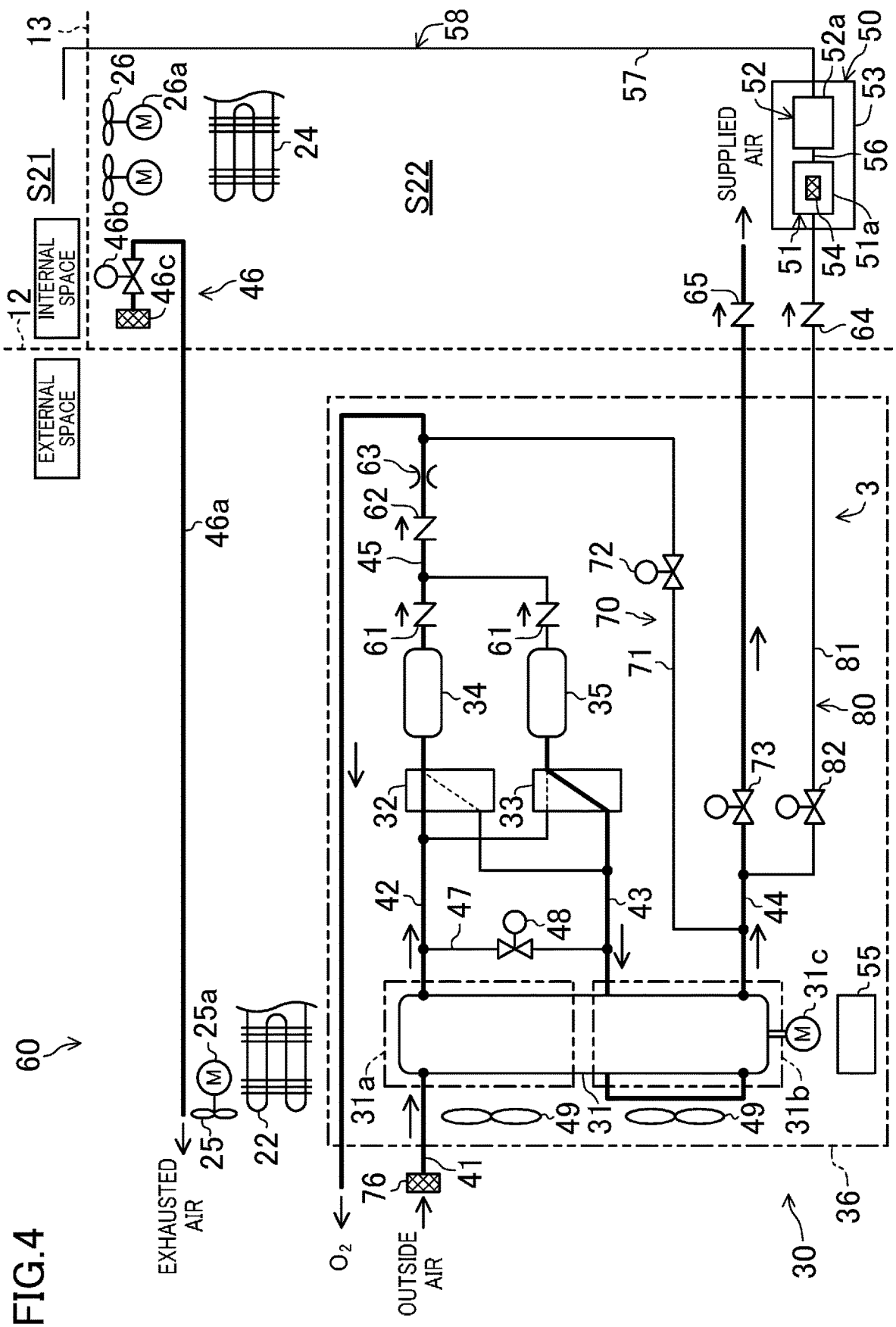
FIG. 4 is a piping system diagram illustrating a configuration of an inside air control apparatus of the first embodiment, together with the flow of air during a first operation.

As shown in FIG. 4, the inside air control apparatus (60) includes a gas supply device (30), an exhaust portion (46), a sensor unit (50), and a controller (55), and controls the oxygen concentration and carbon dioxide concentration of the air in the container (11). The term "concentration" to be used in the following description always indicates a "volumetric concentration."

[Gas Supply Device]

—Configuration of Gas Supply Device—

The gas supply device (30) is a device that produces, from the outside air, low oxygen concentration air having a higher nitrogen concentration and lower oxygen concentration than the outside air, and a carbon dioxide concentration equal to that of the outside air, and supplies the low oxygen concentration air into the container (11). In this embodiment, the gas supply device (30) is comprised of a vacuum pressure swing adsorption (VPSA)-type device. Further, the gas supply device (30) is disposed at the lower left corner of the external storage space (S1), as shown in FIG. 1.

As shown in FIG. 4, the gas supply device (30) includes an air circuit (3) connecting together an air pump (31), first and second directional control valves (32) and (33), and first and second adsorption columns (34) and (35) each provided with an adsorbent for adsorbing a nitrogen component in the air, and a unit case (36) housing these components of the air circuit (3). In this manner, the gas supply device (30) forms a single unit with these components housed in the unit case (36), and is configured to be retrofitted to the container refrigeration apparatus (10).

(Air Pump)

The air pump (31) is provided in the unit case (36), and includes a first pump mechanism (a pressurizing portion) (31a) and a second pump mechanism (a depressurizing portion) (31b), each of which sucks and compresses the air and discharges compressed air. The first and second pump mechanisms (31a) and (31b) are connected to a drive shaft of a motor (31c), and are driven in rotation by the motor (31c) to suck and compress the air, and discharge the compressed air.

An inlet of the first pump mechanism (31a) is connected to one end of an outside air passage (41) which is arranged to pass through the unit case (36) from the interior to exterior of the unit case. An air-permeable, waterproof membrane filter (76) is provided at the other end of the outside air passage (41). The outside air passage (41) is formed of a flexible tube. Although not shown in the drawings, the other end of the outside air passage (41) where the membrane filter (76) is provided is arranged in the second space (S12) of the external storage space (S1) above the condenser (22). With this configuration, the first pump mechanism (31a) sucks and compresses the outside air from which moisture has been removed while flowing from the exterior to interior of the unit case (36) through the membrane filter (76) provided at the other end of the outside air passage (41). On the other hand, an outlet of the first pump mechanism (31a) is connected to one end of a discharge passage (42). The other end, i.e., a downstream end, of the discharge passage (42) is divided into two branches, which are connected to the first and second directional control valves (32) and (33), respectively.

An inlet of the second pump mechanism (31b) is connected to one end of a suction passage (43). The other end, i.e., an upstream end, of the suction passage (43) is divided into two branches, which are connected to the first and second directional control valves (32) and (33), respectively. An outlet of the second pump mechanism (31b) is connected to one end of a supply passage (44). The other end of the supply passage (44) opens in the secondary space (S22) on the blowout side of the internal fans (26) in the internal storage space (S2) of the container (11). The supply passage (44) is provided with a check valve (65) at the other end portion thereof. The check valve (65) allows the air to flow only from one end to the other end of the supply passage (44) and prevents backflow of the air.

The discharge passage (42) and the suction passage (43) are connected via a bypass passage (47). The bypass passage (47) is provided to perform an outside air introduction operation for supplying the outside air taken into the air pump (31) to the inside of the container (11) as it is by the pressurizing force of the air pump (31). While the outside air introduction operation is performed, the bypass passage (47) guides the outside air taken into the first pump mechanism (31a) of the air pump (31) to the inlet of the second pump mechanism (31b) after bypassing the first and second adsorption columns (34) and (35). The bypass passage (47) is provided with a bypass on-off valve (48), an opening/closing operation of which is controlled by the controller (55). The controller (55) controls the opening/closing operation of the bypass open/close valve (48). The bypass on-off valve (48) opens only during the outside air introduction operation, and is kept closed in other periods.

The first and second pump mechanisms (31a) and (31b) of the air pump (31) are configured as oil-free pumps using no lubricant oil. Two blower fans (49) are disposed on the side of the air pump (31) to cool the air pump (31) by blowing air toward the air pump (31).

(Directional Control Valves)

The first and second directional control valves (32) and (33) are provided between the air pump (31) and the first and second adsorption columns (34) and (35) in the air circuit (3), and switches the connection between the air pump (31) and the first and second adsorption columns (34) and (35) among four connection states described later (first to fourth connection states). The controller (55) controls the switching.

Specifically, the first directional control valve (32) is connected to the discharge passage (42) connected to the outlet of the first pump mechanism (31a), the suction passage (43) connected to the inlet of the second pump mechanism (31b), and one end portion of the first adsorption column (34) (functioning as an inflow port during pressurization). The first directional control valve (32) switches between a first state in which the first adsorption column (34) is allowed to communicate with the outlet of the first pump mechanism (31a) to be blocked from the inlet of the second pump mechanism (31b) (the state shown in FIG. 4), and a second state in which the first adsorption column (34) is allowed to communicate with the inlet of the second pump mechanism (31b) to be blocked from the outlet of the first pump mechanism (31a) (the state shown in FIG. 5).

The second directional control valve (33) is connected to the discharge passage (42) connected to the outlet of the first pump mechanism (31a), the suction passage (43) connected to the inlet of the second pump mechanism (31b), and one end portion of the second adsorption column (35). The second directional control valve (33) switches between a first state in which the second adsorption column (35) is allowed to communicate with the inlet of the second pump mechanism (31b) to be blocked from the outlet of the first pump mechanism (31a) (the state shown in FIG. 4), and a second state in which the second adsorption column (35) is allowed to communicate with the outlet of the first pump mechanism (31a) to be blocked from the inlet of the second pump mechanism (31b) (the state shown in FIG. 5).

If the first and second directional control valves (32) and (33) are set to be the first state, the air circuit (3) is switched to the first connection state in which the outlet of the first pump mechanism (31a) is connected to the first adsorption column (34), and the inlet of the second pump mechanism (31b) is connected to the second adsorption column (35) (see FIG. 4). In this state, an adsorption operation is performed on the first adsorption column (34) to adsorb a nitrogen component in the outside air onto the adsorbent, and a desorption operation is performed on the second adsorption column (35) to desorb the nitrogen component adsorbed onto the adsorbent.

Figure 5:
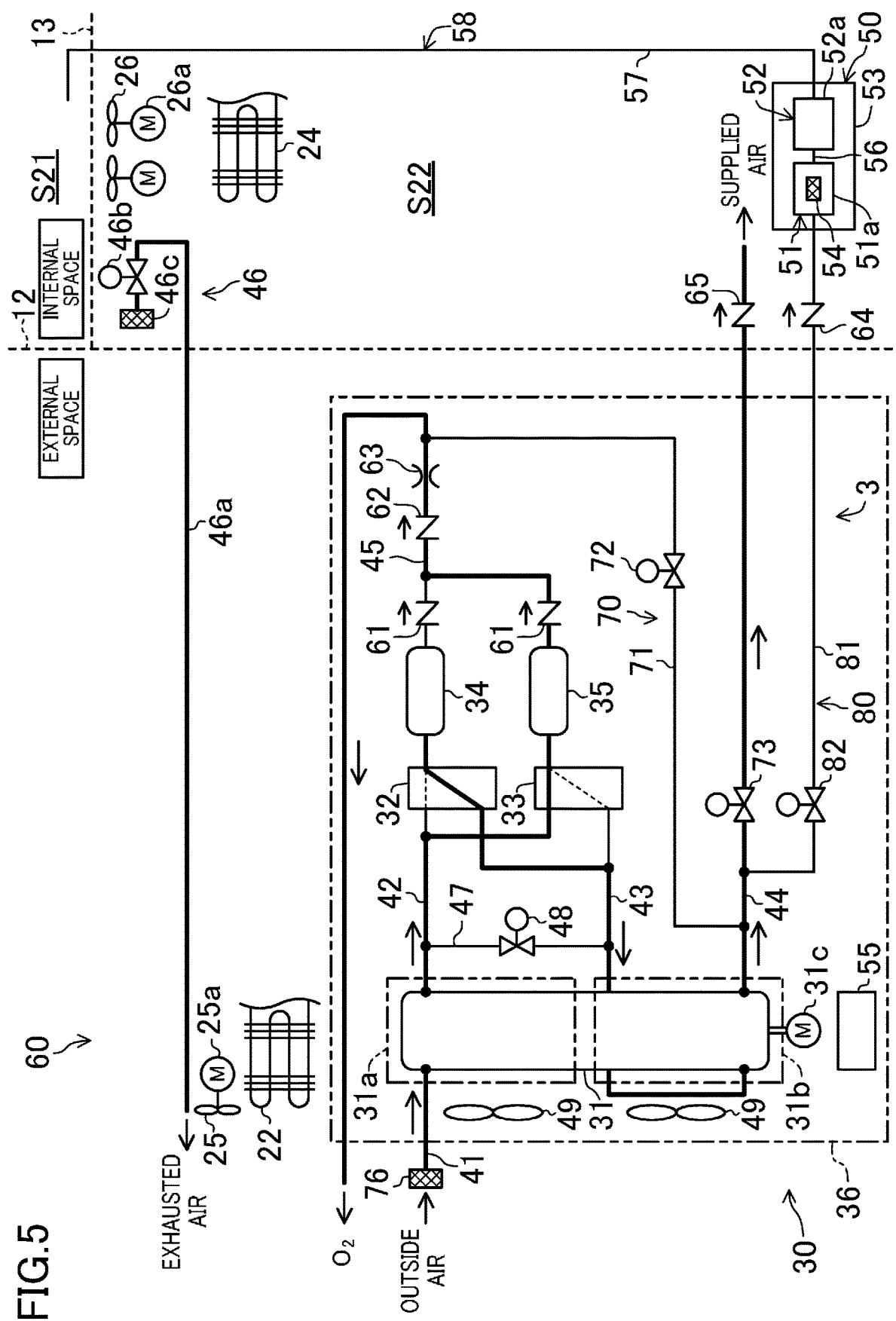
FIG. 5 is a piping system diagram illustrating a configuration of the inside air control apparatus of the first embodiment, together with the flow of air during a second operation.

If the first and second directional control valves (32) and (33) are set to be the second state, the air circuit (3) is switched to the second connection state in which the outlet of the first pump mechanism (31a) is connected to the second adsorption column (35), and the inlet of the second pump mechanism (31b) is connected to the first adsorption column (34) (see FIG. 5). In this state, the adsorption operation is performed on the second adsorption column (35), and the desorption operation is performed on the first adsorption column (34).

Figure 6:
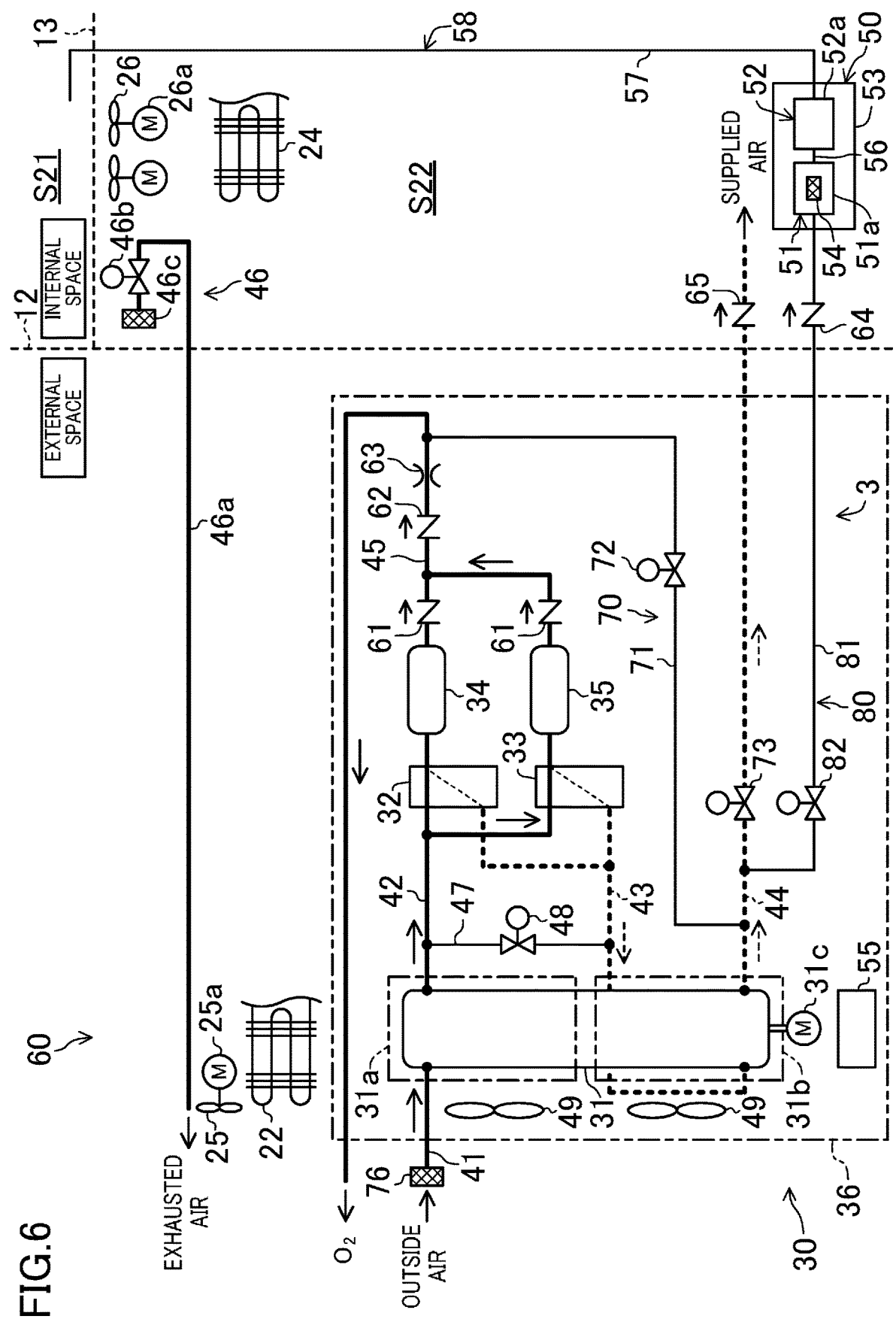
FIG. 6 is a piping system diagram illustrating a configuration of the inside air control apparatus of the first embodiment, together with the flow of air during a pressure equalization operation.

If the first directional control valve (32) is set to be the first state and the second directional control valve (33) is set to be the second state, the air circuit (3) is switched to the third connection state in which the outlet of the first pump mechanism (31a) is connected to the first adsorption column (34), and the outlet of the first pump mechanism (31a) is connected to the second adsorption column (35) (see FIG. 6). In this state, both of the first and second adsorption columns (34) and (35) are connected to the outlet of the first pump mechanism (31a), and the compressed outside air is supplied from the first pump mechanism (31a) to both of the first and second adsorption columns (34) and (35).

If the first directional control valve (32) is set to be the second state and the second directional control valve (33) is set to be the first state, the air circuit (3) is switched to the fourth connection state in which the inlet of the second pump mechanism (31b) is connected to the first adsorption column (34), and the inlet of the second pump mechanism (31b) is connected to the second adsorption column (35). In this state, both of the first and second adsorption columns (34) and (35) are connected to the inlet of the second pump mechanism (31b), and are blocked from the outlet of the first pump mechanism (31a).

(Adsorption Column)

The first and second adsorption columns (34) and (35) are configured as cylindrical members filled with an adsorbent. The adsorbent that fills the first and second adsorption columns (34) and (35) adsorbs a nitrogen component in a pressurized state, and desorbs the nitrogen component in a depressurized state.

The adsorbent that fills the first and second adsorption columns (34) and (35) may be made of porous zeolite having pores with a diameter smaller than the diameter of a nitrogen molecule (3.0 angstrom) and larger than the diameter of an oxygen molecule (2.8 angstrom), for example. The nitrogen component in the air may be adsorbed using zeolite having pores of such a diameter as the adsorbent.

Cations exist in the pores of zeolite, and thus, an electric field has been generated to cause polarity. Therefore, zeolite has the property of adsorbing polar molecules such as a water molecule. As a result, the adsorbent made of zeolite and filling the first and second adsorption columns (34) and (35) adsorbs not only nitrogen, but also moisture (vapor), in the air. The moisture adsorbed onto the adsorbent is desorbed from the adsorbent together with the nitrogen component as a result of the desorption operation. Consequently, low oxygen concentration air including moisture is supplied into the container (11), thus increasing the humidity in the container (11). Furthermore, the adsorbent is regenerated, which may extend the adsorbent's life.

In this configuration, if the air pump (31) supplies the compressed outside air to the first and second adsorption columns (34) and (35) to pressurize these columns (34) and (35), the nitrogen component in the outside air is adsorbed onto the adsorbent. This produces high oxygen concentration air having a lower nitrogen concentration and higher oxygen concentration than the outside air by including less nitrogen component than the outside air does. On the other hand, if the air pump (31) sucks the air from the first and second adsorption columns (34) and (35) to depressurize these columns (34) and (35), the nitrogen component adsorbed onto the adsorbent is desorbed. This produces low oxygen concentration air having a higher nitrogen concentration and lower oxygen concentration than the outside air by including more nitrogen component than the outside air does.

The respective other ends of the first and second adsorption columns (34) and (35) (functioning as outflow ports during pressurization) are connected to one end of an oxygen exhaust passage (45) through which the high oxygen concentration air that has been produced in the first and second adsorption columns (34) and (35) from the compressed outside air supplied by the first pump mechanism (31a) is guided toward the outside of the container (11). The one end of the oxygen exhaust passage (45) is divided into two branches, which are connected to the other ends of the first and second adsorption columns (34) and (35), respectively. The other end of the oxygen exhaust passage (45) opens outside the gas supply device (30), i.e., outside the container (11). Junctions of the oxygen exhaust passage (45) and the other ends of the first and second adsorption columns (34) and (35) are respectively provided with check valves (61) which prevent backflow of the air from the oxygen exhaust passage (45) toward the first and second adsorption columns (34) and (35).

A check valve (62) and an orifice (63) are arranged at some intermediate positions of the oxygen exhaust passage (45) so as to be sequentially arranged from one end to the other end of the oxygen exhaust passage (45). The check valve (62) prevents backflow of the low oxygen concentration air from an exhaust connection passage (71), which will be described later, toward the first and second adsorption columns (34) and (35). The orifice (63) decompresses the high oxygen concentration air which has flowed out of the first and second adsorption columns (34) and (35) before the high oxygen concentration air is exhausted out of the container.

(Supply-Exhaust Switching Mechanism)

The air circuit (3) is provided with a supply-exhaust switching mechanism (70) which switches between a gas supply operation (see FIGS. 4 and 5) for supplying the produced low oxygen concentration air into the container (11), and a gas exhaust operation (see FIG. 7) for exhausting the produced low oxygen concentration outside the container (11). The gas supply operation and the gas exhaust operation will be described later. The supply-exhaust switching mechanism (70) includes an exhaust connection passage (71), an exhaust on-off valve (72), and a supply on-off valve (73).

The exhaust connection passage (71) has one end connected to the supply passage (44), and the other end connected to the oxygen exhaust passage (45). The other end of the exhaust connection passage (71) is connected to the oxygen exhaust passage (45) so as to be located further toward the outside of the container than the orifice (63).

The exhaust on-off valve (72) is provided for the exhaust connection passage (71). The exhaust on-off valve (72) is provided at an intermediate position of the exhaust connection passage (71), and is comprised of an electromagnetic valve which is switched between an open state in which the flow of the low oxygen concentration air from the supply passage (44) is allowed, and a closed state in which the flow of the low oxygen concentration air is blocked. The controller (55) controls an opening/closing operation of the exhaust on-off valve (72).

The supply on-off valve (73) is provided at the supply passage (44) so as to be located further toward the other end (toward the inside of the container) than the junction where the exhaust connection passage (71) is connected. The supply on-off valve (73), which is located further toward the inside of the container than the junction with the exhaust connection passage (71) of the supply passage (44), is comprised of an electromagnetic valve which is switched between an open state in which the flow of the low oxygen concentration air toward the inside of the container is allowed, and a closed state in which the flow of the low oxygen concentration air toward the inside of the container is blocked. The controller (55) controls an opening/closing operation of the supply on-off valve (73).

The supply-exhaust switching mechanism (70) allows the gas supply device (30) to change the amount of the low oxygen concentration air supplied into the container (11) in a plurality of stages. In the present embodiment, the gas supply device (30) is configured to be able to change the amount of the low oxygen concentration air supplied into the container (11) in 15 stages.

(Measurement Unit)

The air circuit (3) is provided with a measurement unit (80) for performing a supply air measurement operation to measure the concentration of the produced low oxygen concentration air using an oxygen sensor (51) of a sensor unit (50), which will be described later, provided in the container (11). The measurement unit (80) includes a branch pipe (a measurement passage) (81) and a measurement on-off valve (82), and allows part of the low oxygen concentration air flowing through the supply passage (44) to be diverged toward the oxygen sensor (51).

Specifically, the branch pipe (81) has one end connected to the supply passage (44), and the other end coupled to an oxygen sensor box (51a), which will be described later, of the oxygen sensor (51). In this embodiment, the branch pipe (81) is branched from the supply passage (44) in the unit case (36), and extends from the interior to exterior of the unit case (36). A check valve (64) is provided at the other end portion of the branch pipe (81) to allow the air to flow only from one end to the other end of the branch pipe (81) and prevent backflow of the air.

The measurement on-off valve (82) is provided for the branch pipe (81) in the unit case. The measurement on-off valve (82) is comprised of an electromagnetic valve which switches between an open state in which the flow of the low oxygen concentration air in the branch pipe (81) is allowed, and a closed state in which the flow of the low oxygen concentration air in the branch pipe (81) is blocked. The controller (55) controls an opening/closing operation of the measurement on-off valve (82). As will be described in detail later, the measurement on-off valve (82) is open only when a supply air measurement operation to be described later is performed, and is closed in the other modes.

—Operation of Gas Supply Device—

(Gas Production Operation)

The gas supply device (30) alternately repeats a first operation (see FIG. 4) in which the first adsorption column (34) is pressurized and the second adsorption column (35) is depressurized in parallel, and a second operation (see FIG. 5) in which the first adsorption column (34) is depressurized and the second adsorption column (35) is pressurized in parallel for every predetermined time (e.g., 14.5 seconds) so as to produce the low oxygen concentration air and the high oxygen concentration air. In this embodiment, a pressure equalization operation (see FIG. 6) in which both of the first and second adsorption columns (34) and (35) are pressurized is performed for a predetermined time (e.g., 1.5 seconds) between the first and second operations (see FIG. 8). The controller (55) controls the first and second directional control valves (32) and (33) to perform the switching among these operations.

<<First Operation>>

During the first operation, the controller (55) switches the first and second directional control valves (32) and (33) together to the first state shown in FIG. 4. Thus, the air circuit (3) is set to the first connection state in which the first adsorption column (34) communicates with the outlet of the first pump mechanism (31a) and is blocked from the inlet of the second pump mechanism (31b), and the second adsorption column (35) communicates with the inlet of the second pump mechanism (31b) and is blocked from the outlet of the first pump mechanism (31a).

The first pump mechanism (31a) supplies the compressed outside air to the first adsorption column (34). A nitrogen component contained in the air that has flowed into the first adsorption column (34) is adsorbed on the adsorbent of the first adsorption column (34). Thus, during the first operation, the first pump mechanism (31a) supplies the compressed outside air to the first adsorption column (34), in which the adsorbent adsorbs the nitrogen component in the outside air. As a result, high oxygen concentration air having a lower nitrogen concentration and a higher oxygen concentration than the outside air is produced. The high oxygen concentration air flows from the first adsorption column (34) to the oxygen exhaust passage (45).

On the other hand, the second pump mechanism (31b) sucks the air from the second adsorption column (35). In parallel, the second pump mechanism (31b) also sucks the nitrogen component that has been adsorbed onto the adsorbent in the second adsorption column (35) together with the air, thereby allowing the adsorbent to desorb the nitrogen component. Thus, during the first operation, the second pump mechanism (31b) sucks the air out of the second adsorption column (35) to allow the adsorbent to desorb the nitrogen component adsorbed thereon. This produces low oxygen concentration air containing the nitrogen component desorbed from the adsorbent, and having a higher nitrogen concentration and a lower oxygen concentration than the outside air. The low oxygen concentration air is sucked into the second pump mechanism (31b), compressed, and discharged to the supply passage (44).

<<Second Operation>>

During the second operation, the controller (55) switches the first and second directional control valves (32) and (33) to the second state shown in FIG. 5. Thus, the air circuit (3) is set to the second connection state in which the first adsorption column (34) communicates with the inlet of the second pump mechanism (31b) and is blocked from the outlet of the first pump mechanism (31a), and the second adsorption column (35) communicates with the outlet of the first pump mechanism (31a) and is blocked from the inlet of the second pump mechanism (31b).

The first pump mechanism (31a) supplies the compressed outside air to the second adsorption column (35). A nitrogen component contained in the air that has flowed into the second adsorption column (35) is adsorbed on the adsorbent of the second adsorption column (35). Thus, during the second operation, the first pump mechanism (31a) supplies the compressed outside air to the second adsorption column (35), in which the adsorbent adsorbs the nitrogen component in the outside air. As a result, high oxygen concentration air having a lower nitrogen concentration and a higher oxygen concentration than the outside air is produced. The high oxygen concentration air flows from the second adsorption column (35) to the oxygen exhaust passage (45).

On the other hand, the second pump mechanism (31b) sucks the air from the first adsorption column (34). In parallel, the second pump mechanism (31b) also sucks the nitrogen component that has been adsorbed onto the adsorbent in the first adsorption column (34) together with the air, thereby allowing the adsorbent to desorb the nitrogen component. Thus, during the second operation, the second pump mechanism (31b) sucks the air out of the first adsorption column (34) to allow the adsorbent to desorb the nitrogen component adsorbed thereon. This produces low oxygen concentration air containing the nitrogen component desorbed from the adsorbent, and having a higher nitrogen concentration and a lower oxygen concentration than the outside air. The low oxygen concentration air is sucked into the second pump mechanism (31b), compressed, and discharged to the supply passage (44).

<<Pressure Equalization Operation>>

As shown in FIG. 6, during the pressure equalization operation, the controller (55) switches the first directional control valve (32) to the first state, and the second directional control valve (33) to the second state. Thus, the air circuit (3) is set to the third connection state in which both of the first and second adsorption columns (34) and (35) communicate with the outlet of the first pump mechanism (31a) and are blocked from the inlet of the second pump mechanism (31b).

The first pump mechanism (31a) supplies the compressed outside air to both of the first and second adsorption columns (34) and (35). A nitrogen component contained in the air that has flowed into the first and second adsorption columns (34) and (35) is adsorbed on the adsorbents of the first and second adsorption columns (34) and (35), thereby producing the high oxygen concentration air. The high oxygen concentration air flows from the first and second adsorption columns (34) and (35) to the oxygen exhaust passage (45).

On the other hand, the second pump mechanism (31b) is blocked from the first and second adsorption columns (34) and (35). Thus, in the pressure equalization operation, no further low oxygen concentration air is produced in the first and second adsorption columns (34) and (35). The second pump mechanism (31b) sucks and compresses the low oxygen concentration air remaining in the suction passage (43), and discharges the compressed low oxygen concentration air into the supply passage (44).

As mentioned above, in the first operation, the first adsorption column (34) is pressurized by the first pump mechanism (31a) to perform the adsorption operation, whereas the second adsorption column (35) is depressurized by the second pump mechanism (31b) to perform the desorption operation. On the other hand, in the second operation, the second adsorption column (35) is pressurized by the first pump mechanism (31a) to perform the adsorption operation, and the first adsorption column (34) is depressurized by the second pump mechanism (31b) to perform the desorption operation. Thus, when the first operation is switched to the second operation or the second operation is switched to the first operation without the pressure equalization operation performed between the first and second operations, the pressure in the adsorption column where the desorption operation has been performed before the switching is remarkably low immediately after the switching. Thus, it takes time until the pressure in this adsorption column increases, and the adsorption operation does not start immediately after the switching.

Thus, in this embodiment, the air circuit (3) is switched to the third connection state when the first operation is switched to the second operation and when the second operation is switched to the first operation, so that the first and second adsorption columns (34) and (35) communicate with each other via the first and second directional control valves (32) and (33). In this configuration, the internal pressures of the first and second adsorption columns (34) and (35) are immediately equalized (i.e., become intermediate pressures between the respective inner pressures). The pressure equalization operation immediately increases the pressure in the adsorption column which has been depressurized by the second pump mechanism (31b) and performing the desorption operation before the switching. Thus, the adsorption operation is performed immediately after the connection with the first pump mechanism (31a).

In this manner, the gas supply device (30) alternately repeats the first and second operations, with the pressure equalization operation performed between the first and second operations, thereby producing the low oxygen concentration air and the high oxygen concentration air in the air circuit (3).

(Gas Supply Operation/Gas Exhaust Operation)

The supply-exhaust switching mechanism (70) switches the gas supply device (30) between a gas supply operation in which the low oxygen concentration air produced in the air circuit (3) is supplied into the container (11), and a gas exhaust operation in which the produced low oxygen concentration air is exhausted outside for a predetermined time since the desorption operation was started without supplying the low oxygen concentration air into the container.

<<Gas Supply Operation>>

During the gas supply operation, as shown in FIGS. 4 to 6, the controller (55) closes the exhaust on-off valve (72), and opens the supply on-off valve (73). As a result, the low oxygen concentration air produced alternately in the first and second adsorption columns (34) and (35) is supplied into the container (11) through the supply passage (44), and the high oxygen concentration air is exhausted out of the container through the oxygen exhaust passage (45).

<<Gas Exhaust Operation>>

Figure 7:
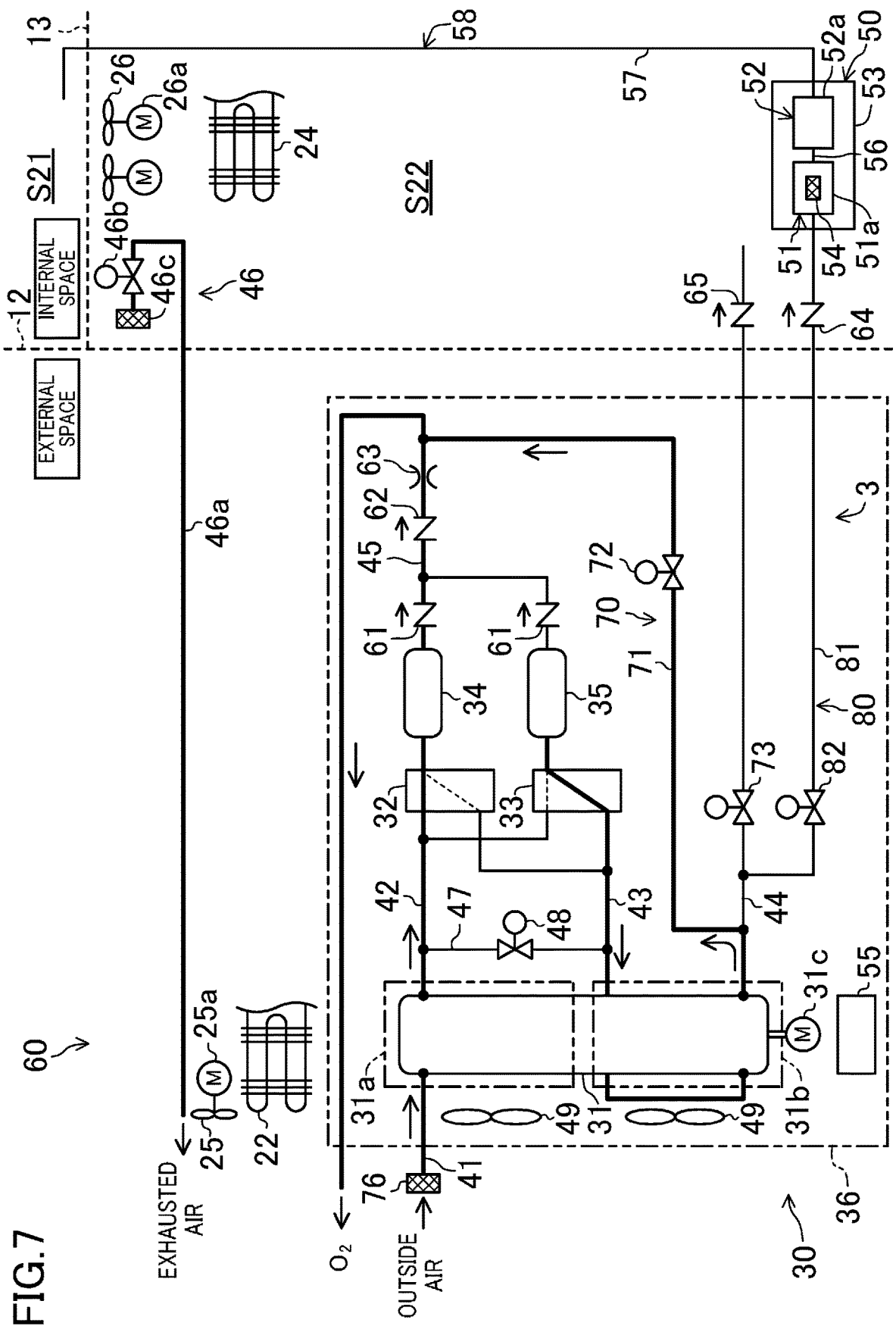
FIG. 7 is a piping system diagram illustrating a configuration of the inside air control apparatus of the first embodiment, together with the flow of air during a gas exhaust operation.

During the gas exhaust operation, as shown in FIG. 7, the controller (55) opens the exhaust on-off valve (72), and closes the supply on-off valve (73). As a result, the low oxygen concentration air produced alternately in the first and second adsorption columns (34) and (35) and discharged to the supply passage (44) is not allowed to flow further toward the inside of the container than the supply on-off valve (73) in the supply passage (44), and flows into the exhaust connection passage (71). The low oxygen concentration air that has flowed into the exhaust connection passage (71) flows into the oxygen exhaust passage (45), and is exhausted outside the container together with the high oxygen concentration air flowing through the oxygen exhaust passage (45).

(Operation Modes of Gas Supply Device)

The gas supply device (30) is configured to be able to operate in an outside air introduction mode, 15 gas supply modes (first to fifteenth gas supply modes), and a breathing mode. The outside air introduction mode is a mode in which the outside air is introduced into the container, and the outside air introduction operation is performed. Each gas supply mode is a mode in which the low oxygen concentration air is supplied into the container, and the gas supply operation and the gas exhaust operation are repeatedly performed. The breathing mode is an operation mode in which the gas supply device (30) stops supplying the low oxygen concentration air and the outside air into the container (11) to change the composition of the inside air through the breathing of the plants (15) in the container. Each operation mode will be described in detail below.

<<Outside Air Introduction Mode>>

In the outside air introduction mode, the controller (55) switches the first directional control valve (32) to the second state, and the second directional control valve (33) to the first state. Thus, the air circuit (3) is set to the fourth connection state in which both of the first and second adsorption columns (34) and (35) are blocked from the outlet of the first pump mechanism (31a) and communicate with the inlet of the second pump mechanism (31b). In the outside air introduction mode, the controller (55) opens the bypass on-off valve (48).

Through this control, the first pump mechanism (31a) is blocked from the first and second adsorption columns (34) and (35). Thus, the outside air sucked into and compressed by the first pump mechanism (31a) of the air pump (31) flows into the bypass passage (47) from the discharge passage (42) without flowing into the first and second adsorption columns (34) and (35). The outside air that has flowed into the bypass passage (47) flows through the suction passage (43) and is sucked into the second pump mechanism (31b). The second pump mechanism (31b) compresses the sucked outside air and discharges the compressed outside air to the supply passage (44). Thus, in the outside air introduction mode, the outside air introduction operation is performed, in which the outside air taken into the air pump (31) is supplied into the container (11) as it is by the pressurizing force of the air pump (31).

<<Gas Supply Mode>>

In the first to fifteenth gas supply modes, the amount of the low oxygen concentration air supplied into the container (amount of gas supply) varies, i.e., the amount of gas supply increases in the order of the first gas supply mode, the second gas supply mode, . . . , and the fifteenth gas supply mode. Specifically, the amount of gas supply is the minimum in the first gas supply mode, and the maximum in the fifteenth gas supply mode. Switching among the first to fifteenth gas supply modes is made when the controller (55) changes time (t seconds) for the gas exhaust operation.

In each gas supply mode, the controller (55) switches the first and second directional control valves (32) and (33) to cause the gas supply device (30) to alternately repeat the first and second operations, with the pressure equalization operation performed between the first and second operations, thereby producing the low oxygen concentration air having a higher nitrogen concentration and lower oxygen concentration than the outside air (gas production operation). In this embodiment, each of the first and second operations is performed for 14.5 seconds, and the pressure equalization operation is performed for 1.5 seconds.

Note that in each of the first and second operations, the low oxygen concentration air produced in an initial stage of the operation and the low oxygen concentration air produced in a terminal stage of the operation have different compositions. Specifically, in the initial stage of each operation, the low oxygen concentration air having a relatively high oxygen concentration is produced because the outside air still remains in the adsorption columns and the pipes. In the terminal stage of each operation, the low oxygen concentration air having a relatively low oxygen concentration is produced because the pressure in the adsorption columns becomes lower than that in the initial stage, and more nitrogen component is desorbed.

In each gas supply mode, the controller (55) instructs the exhaust on-off valve (72) to open and the supply on-off valve (73) to close as shown in FIGS. 7 and 9 for a predetermined time (t seconds from the start of each operation in this embodiment) in the initial stage of the first and second operations to cause the gas supply device (30) to perform, not the gas supply operation, but the gas exhaust operation. That is, part of the low oxygen concentration air produced through the gas production operation having a relatively high oxygen concentration is not supplied into, but exhausted out of, the container (11).

Then, the controller (55) instructs the exhaust on-off valve (72) to close and the supply on-off valve (73) to open after the end of the predetermined time (after the end of the gas exhaust operation) to cause the gas supply device (30) to perform the gas supply operation. That is, part of the low oxygen concentration air produced through the gas production operation having a relatively low oxygen concentration is supplied into the container (11).

In each gas supply mode, as described above, the gas supply device (30) intermittently performs the gas supply operation when the low oxygen concentration air having a relatively low oxygen concentration is produced through the gas production operation, so that only the low oxygen concentration air having the relatively low oxygen concentration is supplied into the container (11).

Switching among the gas supply modes is made when the controller (55) changes the time for the gas exhaust operation. More specifically, the controller (55) is configured to perform the switching among the first to fifteenth gas supply modes which are different in the amount of gas supply, through changing the time t for the gas exhaust operation performed during an initial predetermined time of each of the first and second operations (t seconds from the start of each operation in this embodiment). In the first embodiment, the time t for the gas exhaust operation in the fifteenth gas supply mode is set to be three seconds, which gradually increases by 0.5 seconds in order from the fifteenth gas supply mode to the first gas supply mode and becomes ten seconds in the first gas supply mode.

The gas supply device (30) is configured to be able to change the operation mode in this way such that the amount of the low oxygen concentration air supplied into the container (the amount of gas supply) can be changed in a plurality of stages, and the oxygen concentration of the low oxygen concentration air supplied into the container decreases with a decrease in the amount of gas supply. In the present embodiment, the low oxygen concentration air having an oxygen concentration of 3% is supplied into the container in the first gas supply mode in which the amount of gas supply is the minimum, and the low oxygen concentration air having an oxygen concentration of 8% is supplied into the container in the fifteenth gas supply mode in which the amount of gas supply is the maximum.

<<Breathing Mode>>

The breathing mode is a standby operation in which the gas supply device (30) stops supplying the low oxygen concentration air and the outside air into the container (11) to change the composition of the inside air through the breathing of the plants (15) in the container. In the breathing mode, the air pump (31) stops, and the exhaust on-off valve (72) is closed. In the breathing mode, the measurement on-off valve (82) is closed to cause the sensor unit (50), which will be described later, to measure the oxygen concentration and carbon dioxide concentration of the inside air. Note that, in the breathing mode, the gas supply device (30) is not completely stopped, but is in a standby state so that the gas supply device (30) can be activated immediately upon receiving a command from the controller (55).

[Exhaust Portion]

—Configuration of Exhaust Portion—

As shown in FIG. 2, the exhaust portion (46) includes an exhaust passage (46a) connecting the internal storage space (S2) and the external space of the container together, an exhaust valve (46b) connected to the exhaust passage (46a), and a membrane filter (46c) provided at an inlet end (an end located inside the container) of the exhaust passage (46a). The exhaust passage (46a) passes through the casing (12) from the interior to exterior of the casing (12). The exhaust valve (46b) is provided adjacent to an internal end of the exhaust passage (46a), and is comprised of an electromagnetic valve which is switched between an open state in which the flow of the air in the exhaust passage (46a) is allowed, and a closed state in which the flow of the air in the exhaust passage (46a) is blocked. The controller (55) controls an opening/closing operation of the exhaust valve (46b).

—Operation of Exhaust Portion—

When the internal fans (26) are rotating, an exhaust operation is performed. That is, the controller (55) opens the exhaust valve (46b) to exhaust the air (inside air) in the internal storage space (S2) communicating with the inside of the container to the outside of the container.

Specifically, when the internal fans (26) are rotating, the pressure of the secondary space (S22) on the blowout side becomes higher than the pressure of the external space of the container (i.e., the atmospheric pressure). Thus, when the exhaust valve (46b) is open, due to the differential pressure between the ends of the exhaust passage (46a) (the differential pressure between the external space of the container and the secondary space (S22)), the air in the internal storage space (S2) communicating with the inside of the container (inside air) is exhausted out of the container via the exhaust passage (46a).

[Sensor Unit]

—Configuration of Sensor Unit—

As shown in FIG. 2, the sensor unit (50) is provided in the secondary space (S22) on the blowout side of the internal fans (26) in the internal storage space (S2). The sensor unit (50) includes an oxygen sensor (51), a carbon dioxide sensor (52), a fixing plate (53), a membrane filter (54), a connection pipe (56), and an exhaust pipe (57).

The oxygen sensor (51) has an oxygen sensor box (51a) housing a galvanic cell-type sensor therein. The oxygen sensor (51) measures a current flowing through an electrolytic solution of the galvanic cell-type sensor to measure the oxygen concentration of gas in the oxygen sensor box (51a). The oxygen sensor box (51a) is fixed to the fixing plate (53). An outer surface of the oxygen sensor box (51a) has an opening, to which the membrane filter (54), which is air-permeable and waterproof, is attached. In addition, one end of the connection pipe (56) is coupled to the oxygen sensor box (51a). Further, a branch pipe (81) of the above-described measurement unit (80) is coupled to the oxygen sensor box (51a).

The carbon dioxide sensor (52) has a carbon dioxide sensor box (52a). The carbon dioxide sensor (52) is a non-dispersive infrared (NDIR) sensor which radiates infrared rays to the gas in the carbon dioxide sensor box (52a) to measure an absorption amount of infrared rays having a wavelength specific to carbon dioxide, thereby measuring the carbon dioxide concentration in the gas. In addition, the other end of the connection pipe (56) is coupled to the carbon dioxide sensor box (52a). In addition, one end of the exhaust pipe (57) is coupled to the carbon dioxide sensor box (52a).

The fixing plate (53) is fixed to the casing (12) with the oxygen sensor (51) and the carbon dioxide sensor (52) attached thereto.

The connection pipe (56) is, as described above, coupled to the oxygen sensor box (51a) and the carbon dioxide sensor box (52a), and allows the internal space of the oxygen sensor box (51a) to communicate with the internal space of the carbon dioxide sensor box (52a).

As described above, the exhaust pipe (57) has one end coupled to the carbon dioxide sensor box (52a), and the other end open near the suction port of the internal fans (26). That is, the exhaust pipe (57) allows the internal space of the carbon dioxide sensor box (52a) to communicate with the primary space (S21) of the internal storage space (S2).

—Concentration Measurement Operation—

As can be seen, the secondary and primary spaces (S22) and (S21) of the internal storage space (S2) communicate with each other via an air passage (58) formed by the membrane filter (54), the internal space of the oxygen sensor box (51a), the connection pipe (56), the internal space of the carbon dioxide sensor box (52a), and the exhaust pipe (57). Thus, when the internal fans (26) are in operation, the pressure of the primary space (S21) becomes lower than that of the secondary space (S22). Due to this difference in pressure, the inside air flows from the secondary space (S22) to the primary space (S21) in the air passage (58) connecting the oxygen sensor (51) and the carbon dioxide sensor (52). Thus, the air sequentially flows from the container to the oxygen sensor (51) and the carbon dioxide sensor (52), and then, the oxygen concentration of the inside air is measured by the oxygen sensor (51), and the carbon dioxide concentration of the inside air is measured by the carbon dioxide sensor (52).

[Controller]

Figure 10:
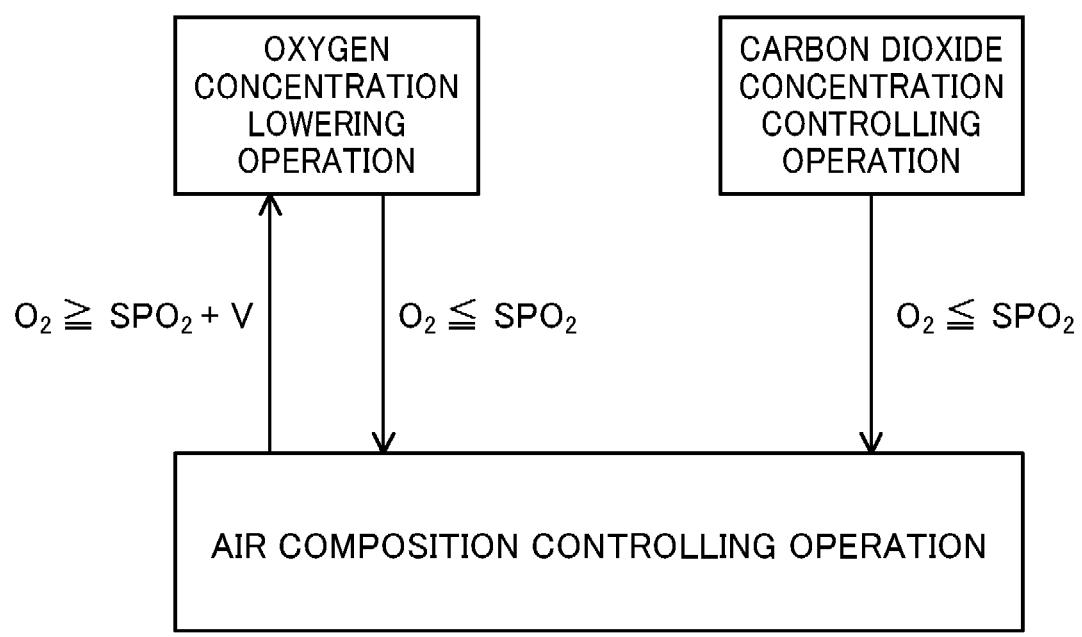
FIG. 10 illustrates how the inside air control apparatus of the first embodiment switches among an oxygen concentration lowering operation, a carbon dioxide concentration controlling operation, and an air composition controlling operation.

As shown in FIG. 10, the controller (55) is configured to cause the inside air control apparatus (60) to perform an oxygen concentration lowering operation, a carbon dioxide concentration controlling operation, and an air composition controlling operation such that the air in the container (11) has desired composition. Specifically, the controller (55) has target oxygen concentrations and target carbon dioxide concentrations different for each plant (15) loaded in the container (11), and controls the operation of the gas supply device (30) and the exhaust portion (46) based on measurement results obtained by the oxygen sensor (51) and the carbon dioxide sensor (52) so that the oxygen concentration and carbon dioxide concentration of the air in the container (11) are controlled to target concentrations (e.g., target oxygen concentration $SPO_2$ and target carbon dioxide concentration $SPCO_2$). The oxygen concentration lowering operation and the carbon dioxide concentration controlling operation are performed to lower the oxygen concentration of the inside air if the oxygen concentration of the inside air is higher than the target oxygen concentration $SPO_2$. The air composition controlling operation is performed if the oxygen concentration of the inside air decreases to be equal to or lower than the target oxygen concentration $SPO_2$ through the oxygen concentration lowering operation or the carbon dioxide concentration controlling operation, such that the oxygen concentration and carbon dioxide concentration of the inside air are controlled to the respective target concentrations. In the air composition controlling operation, if the oxygen concentration of the air in the container (11) reaches or exceeds an upper limit concentration, which is the sum of the target oxygen concentration $SPO_2$ and a predetermined concentration V (1.0% in this embodiment), the controller (55) switches the operation of the inside air control apparatus (60) to the oxygen concentration lowering operation. Details of the operations will be described later.

The controller (55) of this embodiment includes a microcomputer which controls various components of the inside air control apparatus (60) in such a manner as disclosed in this application, and a memory or a hard disk which stores control programs that can be executed. Note that the controller (55) is an example of a controller of the inside air control apparatus (60), and a detailed structure and algorithm of the controller (55) may be comprised of a combination of any kind of hardware and software that can implement the functions disclosed in present application.

—Operation of Container Refrigeration Apparatus—

In this embodiment, a unit controller (100) shown in FIG. 3 performs a cooling operation for cooling the air in the container (11).

During the cooling operation, the unit controller (100) controls the operation of the compressor (21), the expansion valve (23), the external fan (25), and the internal fans (26) such that the temperature of the inside air reaches a desired target temperature based on measurement results provided by a temperature sensor (not shown). In this case, the refrigerant circuit (20) allows the refrigerant to circulate to perform a vapor compression refrigeration cycle. Then, the air in the container (11) guided to the internal storage space (S2) by the internal fans (26) is cooled when passing through the evaporator (24) by the refrigerant flowing through the evaporator (24). The inside air cooled by the evaporator (24) passes through the underfloor path (19a), and is blown again into the container (11) via the blowout port (18b). Thus, the air in the container (11) is cooled.

—Operation of Inside Air Control Apparatus—

The inside air control apparatus (60) performs the oxygen concentration lowering operation, the carbon dioxide concentration controlling operation, and the air composition controlling operation shown in FIG. 10 so that the air in the container (11) has desired composition.

Specifically, at the start of the inside air control apparatus (60) (when the power is turned on), first, the controller (55) makes a priority determination, i.e., determines whether the reduction in the oxygen concentration of the inside air has priority to the control of the carbon dioxide concentration of the inside air (priority is given to oxygen), or the control of the carbon dioxide concentration of the inside air has priority to the reduction in the oxygen concentration of the inside air (priority is given to carbon dioxide), in accordance with the composition of the inside air at the start or the target carbon dioxide concentration $SPCO_2$ preset by a command entered by a user.

In the priority determination, the controller (55) determines to give priority to carbon dioxide if the target carbon dioxide concentration $SPCO_2$ is equal to or greater than 10%, and determines to give priority to oxygen if the target carbon dioxide concentration $SPCO_2$ is less than 4%. Further, in the priority determination, the controller (55) determines to give priority to carbon dioxide if the target carbon dioxide concentration $SPCO_2$ is equal to or greater than 4% and less than 10% and the sum of the carbon dioxide concentration and oxygen concentration of the inside air is greater than 22%. In the priority determination, if the target carbon dioxide concentration $SPCO_2$ is equal to or greater than 4% and less than 10% and the sum of the carbon dioxide concentration and oxygen concentration of the inside air is equal to or less than 22%, the controller (55) determines whether or not an introduction condition indicating that carbon dioxide has been introduced into the container in a period from when the inside air control apparatus (60) is turned off last time to when the inside air control apparatus (60) is turned on this time is satisfied. For example, the controller (55) determines, as the introduction condition, whether the condition where a period from when the inside air control apparatus (60) was turned off last time to when the inside air control apparatus (1) is turned on this time is less than one day, and the condition where the carbon dioxide concentration of the inside air has increased by 4% or more (greater than an increase through the breathing) from the carbon dioxide concentration measured when the inside air control apparatus (60) was turned off last time are satisfied. The controller (55) determines to give priority to carbon dioxide if the introduction condition is determined to be satisfied, and determines to give priority to oxygen if the introduction condition is not determined to be satisfied.

The controller (55) causes the inside air control apparatus (60) to execute the oxygen concentration lowering operation if oxygen is determined to have priority through the priority determination, and causes the inside air control apparatus (60) to execute the carbon dioxide concentration controlling operation if carbon dioxide is determined to have priority through the priority determination. If the oxygen concentration of the inside air reaches or falls below the target oxygen concentration $SPO_2$ during the oxygen concentration lowering operation or the carbon dioxide concentration controlling operation, the controller (55) switches the operation of the inside air control apparatus (60) to the air composition controlling operation. In the air composition controlling operation, if the oxygen concentration of the air in the container (11) reaches or exceeds an upper limit concentration, which is the sum of the target oxygen concentration $SPO_2$ and a predetermined concentration V (1.0% in this embodiment), the controller (55) switches the operation of the inside air control apparatus (60) to the oxygen concentration lowering operation.

Note that in the oxygen concentration lowering operation, the carbon dioxide concentration controlling operation, and the air composition controlling operation, the controller (55) closes the measurement on-off valve (82), communicates with the unit controller (100) to rotate the internal fans (26), and causes the inside air to circulate between the interior of the container and the internal storage space (S2). In this state, the air in the container (11) is supplied to the sensor unit (50). Thus, the oxygen sensor (51) measures the oxygen concentration of the air in the container (11), and the carbon dioxide sensor (52) measures the carbon dioxide concentration of the air in the container (11).

The oxygen concentration lowering operation, the air composition controlling operation, and the carbon dioxide concentration controlling operation will be described in detail in this order.

[Oxygen Concentration Lowering Operation]

If the oxygen concentration of the inside air is higher than the target oxygen concentration $SPO_2$, the oxygen concentration lowering operation is performed to lower the oxygen concentration of the inside air to the target oxygen concentration $SPO_2$ through supplying the low oxygen concentration air into the container, such that the carbon dioxide concentration of the inside air is avoided from exceeding the target carbon dioxide concentration $SPCO_2$.

In the oxygen concentration lowering operation, the controller (55) instructs the gas supply device (30) to perform the gas supply operation mainly in the fifth gas supply mode. The gas supply operation supplies the low oxygen concentration air having an average oxygen concentration of 5% into the container (11). In the oxygen concentration lowering operation, the controller (55) instructs the exhaust valve (46b) of the exhaust portion (46) to open.

When the gas supply device (30) supplies the low oxygen concentration air into the container (11), the inside air in an amount corresponding to the amount of the supplied low oxygen concentration air is exhausted out of the container (11) through the exhaust passage (46a) of the exhaust portion (46). Then, the air present in the container (11) is gradually replaced with the low oxygen concentration air supplied by the gas supply device (30), and as a result, the oxygen concentration of the air in the container (11) is gradually lowered. When the oxygen concentration of the inside air becomes equal to or lower than the target oxygen concentration $SPO_2$ in the oxygen concentration lowering operation, the controller (55) causes the inside air control apparatus (60) to end the oxygen concentration lowering operation, and start the air composition controlling operation.

In the first embodiment, the controller (55) is configured to switch the gas supply mode of the gas supply device (30) from the fifth gas supply mode (in which the oxygen concentration is 5%) to the fifteenth gas supply mode (in which the oxygen concentration is 8%) if the carbon dioxide concentration of the inside air becomes equal to or greater than N1 (e.g., $SPCO_2$-0.5%) in the oxygen concentration lowering operation, and return the gas supply mode of the gas supply device (30) from the fifteenth gas supply mode to the fifth gas supply mode if the carbon dioxide concentration of the inside air becomes equal to or smaller than N2 (e.g., $SPCO_2$-0.9%) during the operation in the fifteenth gas supply mode. In this configuration, if the carbon dioxide concentration of the inside air is increased to approach the target carbon dioxide concentration $SPCO_2$ through the breathing of the plants (15) while the low oxygen concentration air is supplied into the container (11) to lower the oxygen concentration of the inside air, the gas supply mode of the gas supply device (30) is switched to increase the amount of gas supply. This accelerates the exhaust of carbon oxide, and keeps the carbon dioxide concentration of the inside air from increasing. If the oxygen concentration of the inside air is higher than the target oxygen concentration $SPO_2$, the controller (55) lowers the oxygen concentration of the inside air to the target oxygen concentration $SPO_2$ through supplying the low oxygen concentration air into the container, such that the carbon dioxide concentration of the inside air is avoided from exceeding the target carbon dioxide concentration $SPCO_2$.

[Air Composition Controlling Operation]

If the oxygen concentration of the inside air becomes equal to or lower than the target oxygen concentration $SPO_2$ through the oxygen concentration lowering operation or the carbon dioxide concentration controlling operation, the air composition controlling operation is performed such that the oxygen concentration and carbon dioxide concentration of the inside air are controlled to the respective target concentrations.

In the air composition controlling operation, the controller (55) causes the gas supply device (30) to operate while switching the operation mode among the fifth gas supply mode (in which the oxygen concentration is 5%), the fifteenth gas supply mode (in which the oxygen concentration is 8%), the outside air introduction mode, and the breathing mode, such that the oxygen concentration and carbon dioxide concentration of the inside air respectively reach the target oxygen concentration $SPO_2$ and the target carbon dioxide concentration $SPCO_2$.

In addition, in the air composition controlling operation, the controller (55) controls the exhaust valve (46b) of the exhaust portion (46). More specifically, the controller (55) opens the exhaust valve (46b) when the gas supply device (30) is operating in any one of the fifth gas supply mode, the fifteenth gas supply mode, or the outside air introduction mode, and closes the exhaust valve (46b) when the gas supply device (30) is operating in the breathing mode.

In the air composition controlling operation, the controller (55) causes the gas supply device (30) to operate first in the fifteenth gas supply mode, so that the low oxygen concentration air having an average oxygen concentration of 8% is supplied into the container (11). Then, the controller (55) switches the operation of the gas supply device (30) from the fifteenth gas supply mode to the breathing mode, from the fifteenth gas supply mode to the fifth gas supply mode, from the fifteenth gas supply mode to the outside air introduction mode, from the breathing mode to the outside air introduction mode, from the fifth gas supply mode to the outside air introduction mode, from the outside air introduction mode to the fifteenth gas supply mode, from the outside air introduction mode to the breathing mode, or from the breathing mode to the fifteenth gas supply mode as needed, thereby controlling the oxygen concentration of the inside air to be the target oxygen concentration $SPO_2$ and the carbon dioxide concentration of the indoor air to be the target carbon dioxide concentration $SPCO_2$.

As mentioned above, the oxygen concentration of the gas to be supplied into the container increases (5%→8%→21%) in the order of the fifth gas supply mode, the fifteenth gas supply mode, and the outside air introduction mode in which the gas supply device (30) operates during the air composition controlling operation, and the amount of gas supply also increases. In the breathing mode, no gas is supplied into the container, and no inside air is exhausted out of the container. Thus, when the gas supply device (30) is switched from the fifth gas supply mode to the fifteenth gas supply mode, from the fifth gas supply mode to the outside air introduction mode, and from the fifteenth gas supply mode to the outside air introduction mode, the oxygen concentration of the gas supplied into the container increases, but the amount of the inside air exhausted from the container also increases due to the increase in the amount of gas supply. On the other hand, when the gas supply device (30) is switched from the fifteenth gas supply mode to the fifth gas supply mode, or from the outside air introduction mode to the fifteenth gas supply mode, the oxygen concentration of the gas supplied into the container decreases, but the amount of the inside air exhausted from the container also decreases due to the decrease in the amount of gas supply. When the gas supply device (30) is switched from the fifteenth gas supply mode to the breathing mode, or from the outside air introduction mode to the breathing mode, the supply of the gas into the container and the exhaust of the inside air from the container are stopped. On the other hand, when the gas supply device (30) is switched from the breathing mode to the fifteenth gas supply mode, or from the breathing mode to the outside air introduction mode, the supply of the gas into the container and the exhaust of the inside air from the container are resumed.

As can be seen, the controller (55) controls the oxygen concentration and carbon dioxide concentration of the inside air to their target concentrations ($SPO_2$, $SPCO_2$) while switching the operation of the gas supply device (30) as necessary. If the oxygen concentration of the air in the container (11) reaches or exceeds the upper limit concentration, which is the sum of the target oxygen concentration $SPO_2$ and the predetermined concentration V (1.0% in this embodiment), in the air composition controlling operation, the controller (55) switches the operation of the inside air control apparatus (60) to the oxygen concentration lowering operation.

[Carbon Dioxide Concentration Controlling Operation]

The carbon dioxide concentration controlling operation is performed if the oxygen concentration of the inside air is higher than the target oxygen concentration $SPO_2$ (5% in this embodiment). Specifically, in this operation, the oxygen concentration of the inside air is lowered to the target oxygen concentration $SPO_2$ through causing the gas supply device (30) to perform the gas supply operation, while allowing the gas supply device (30) to change the amount of gas supply such that the carbon dioxide concentration of the inside air falls within a reference concentration range A ($A_{min} \leq CO_2 \leq A_{max}$) which is set in accordance with an initial concentration C0, which is the carbon dioxide concentration of the inside air at the start of the operation.

In the carbon dioxide concentration controlling operation, the controller (55) causes the gas supply device (30) to perform the gas supply operation such that the oxygen concentration of the inside air reaches the target oxygen concentration $SPO_2$, while changing the amount of gas supply from the gas supply device (30) such that the carbon dioxide concentration of the inside air falls within the reference concentration range A ($A_{min} \leq CO_2 \leq A_{max}$). The controller (55) performs, in order to change the amount of gas supply from the gas supply device (30), increasing control for increasing the amount of gas supply by one level and reducing control for reducing the amount of gas supply by one level. The increasing control is performed by increasing the ordinal number of the gas supply mode of the gas supply device (30) by one level, and the reducing control is performed by reducing the ordinal number of the gas supply mode of the gas supply device (30) by one level.

In the carbon dioxide concentration controlling operation, the controller (55) controls the exhaust valve (46b) of the exhaust portion (46). The control of the exhaust valve (46b) will be described in detail later.

In the present embodiment, in order to execute the carbon dioxide concentration controlling operation, the controller (55) is previously given with the target oxygen concentration $SPO_2$ and the target carbon dioxide concentration $SPCO_2$ corresponding to the plants (15) loaded in the container (11), and an allowable concentration X (e.g., 10%) as an index concentration of carbon dioxide different from the target carbon dioxide concentration $SPCO_2$. Note that the allowable concentration X is given to the controller (55) as a concentration that is lower than the target carbon dioxide concentration $SPCO_2$, but is acceptable to keep the plants (15) loaded in the container (11) fresh.

<<Setting of Reference Concentration Range>>

Figure 11:
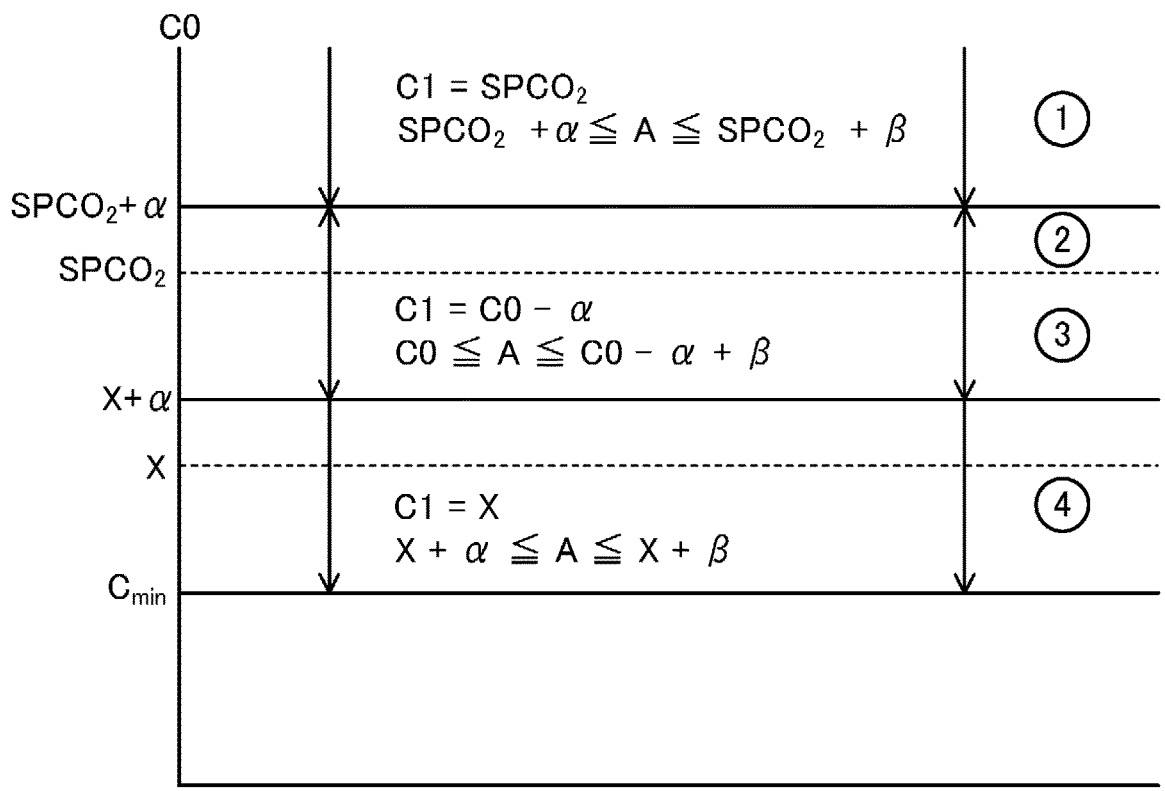
FIG. 11 is a graph illustrating the relationship among an initial concentration, starting concentration, and reference concentration range of a carbon dioxide concentration of inside air in the carbon dioxide concentration controlling operation of the first embodiment.

As shown in FIG. 11, in the carbon dioxide concentration controlling operation, the controller (55) first sets the reference concentration range A, which is a control target for the increasing control and the reducing control, in accordance with the initial concentration C0. The reference concentration range A is set by a starting concentration C1 which is set in accordance with the initial concentration C0. The starting concentration C1 is a concentration that satisfies "C1=C0−α" and "X≤C1≤$SPCO_2$," and the reference concentration range A is a range that satisfies "C1+α≤A≤C1+β(β>α)." In the present embodiment, α and β are respectively assumed to be 0.5% and 0.6%.

When the initial concentration C0 falls within a standard concentration range from a first low concentration which is higher than the allowable concentration X only by a predetermined concentration α (0.5%) to a first high concentration which is higher than the target carbon dioxide concentration $SPCO_2$ only by the predetermined concentration α (X+α≤C0≤$SPCO_2$+α), the starting concentration C1 satisfies "C0−α," and the reference concentration range A satisfies "C0≤A≤C0−α+β." Specifically, when the initial concentration C0 falls within the standard concentration range, the lower limit of the reference concentration range A is the initial concentration C0.

When the initial concentration C0 is lower than the first low concentration (C0<X+α), i.e., falls below the standard concentration range, the starting concentration C1 is "X", and the reference concentration range A satisfies "X+α≤A≤X+β." Specifically, when the initial concentration C0 falls below the standard concentration range, the lower limit of the reference concentration range A is the first low concentration (X+α).

When the initial concentration C0 is higher than the first high concentration (C0>$SPCO_2$+α), i.e., exceeds the standard concentration range, the starting concentration C1 is "$SPCO_2$", and the reference concentration range A satisfies "$SPCO_2$+α≤A≤$SPCO_2$+β." Specifically, when the initial concentration C0 exceeds the standard concentration range, the lower limit of the reference concentration range A is the first high concentration ($SPCO_2$+α).

<<Determination of Threshold in Increasing Control and Reducing Control>>

Figure 12:
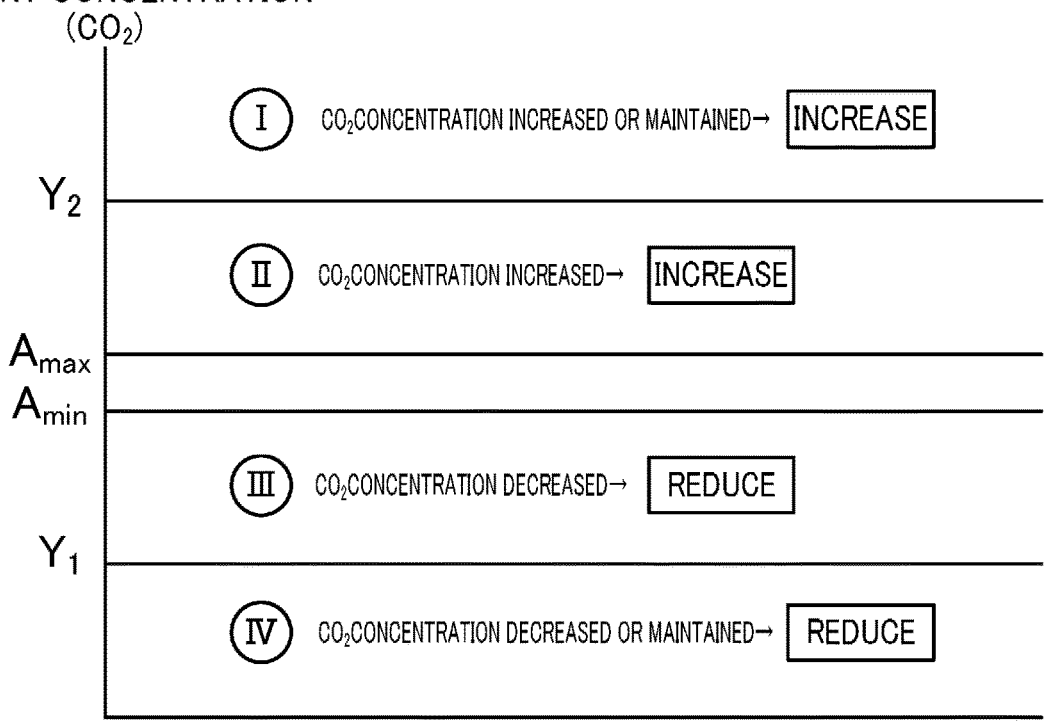
FIG. 12 is a graph illustrating an increasing condition for performing increasing control and a reducing condition for performing reducing control in the carbon dioxide concentration controlling operation of the first embodiment.

As shown in FIGS. 11 to 13, in the carbon dioxide concentration controlling operation, thresholds (second low concentration $Y_1$ and second high concentration $Y_2$) used for the increasing control and the reducing control are different in accordance with the initial concentration C0. Therefore, the controller (55) obtains the second low concentration $Y_1$ and the second high concentration $Y_2$, which are the thresholds used for the increasing control and the reducing control, from the initial concentration C0. The second low concentration $Y_1$ and the second high concentration $Y_2$ are determined as shown in FIG. 13 depending on which of first to fourth concentration ranges the initial concentration C0 falls within as shown in FIG. 11.

Specifically, when the initial concentration C0 falls within the first concentration range which exceeds the first high concentration (C0>SPCO$_2$+α), the second low concentration $Y_1$ is determined to be "SPCO$_2$," and the second high concentration $Y_2$ to satisfy "SPCO$_2$+γ (γ>β)." When the initial concentration C0 falls within the second concentration range which is equal to or higher than the target carbon dioxide concentration SPCO$_2$ and equal to or lower than the first high concentration (SPCO$_2$≤C0≤SPCO$_2$+α), the second low concentration $Y_1$ is determined to satisfy "C0−α," and the second high concentration $Y_2$ to satisfy "C0−α+γ." When the initial concentration C0 falls within the third concentration range which is equal to or higher than the first low concentration and lower than the target carbon dioxide concentration SPCO$_2$ (X+α≤C0<SPCO$_2$), the second low concentration $Y_1$ is determined to satisfy "C0−α," and the second high concentration $Y_2$ to be "SPCO$_2$." When the initial concentration C0 falls within the fourth concentration range which is lower than the first low concentration (C0$_2$<X+α), the second low concentration $Y_1$ is determined to be "X," and the second high concentration $Y_2$ to be "SPCO$_2$." In the present embodiment, γ is assumed to be 0.8%.

<<Increasing Control and Reducing Control>>

As shown in FIG. 12, the increasing control and the reducing control are performed for increasing or reducing the amount of gas supplied through the gas supply operation of the gas supply device (30) depending on which of four concentration ranges I to IV the current carbon dioxide concentration (current concentration CO$_2$) of the inside air falls within, and in accordance with the tendency of the increase or decrease in the current carbon dioxide concentration of the inside air.

Specifically, when the current concentration CO$_2$ is higher than the upper limit $A_{max}$ of the reference concentration range A, i.e., when the current concentration CO$_2$ is within the concentration range I or II ($A_{max}$<CO$_2$), the controller (55) performs the increasing control for increasing the amount of gas supply from the gas supply device (30) by one level if a predetermined concentration increase condition indicating the increase in the carbon dioxide concentration of the inside air is satisfied. That is, the controller (55) increases the gas supply mode of the gas supply device (30) by one level. Note that the concentration increase condition is "CO$_{2\_1hr\ average\ n}$, which is a moving average obtained through 60 calculations of a one-minute average of the carbon dioxide concentration of the inside air measured by the carbon dioxide sensor (52) every four seconds is greater than CO$_{2\_1hr\ average\ n-1}$, which is a moving average obtained last time through 60 calculations of a one-minute average of the carbon dioxide concentration of the inside air measured by the carbon dioxide sensor (52) every four seconds (CO$_{2\_1hr\ average\ n}$>CO$_{2\_1hr\ average\ n-1}$)."

Specifically, if the concentration increase condition is satisfied when the current concentration CO$_2$ is within the concentration range I or II ($A_{max}$<CO$_2$), i.e., when the current concentration CO$_2$ exceeds the reference concentration range A, the controller (55) performs the increasing control for increasing the amount of gas supply to the container (11) to increase the amount of the inside air exhausted, thereby lowering the carbon dioxide concentration of the inside air or its increasing rate.

When the current concentration CO$_2$ is higher than the second high concentration $Y_2$, i.e., when the current concentration CO$_2$ is within the concentration range II (CO$_2$>$Y_2$), the controller (55) performs the increasing control for increasing the amount of gas supply from the gas supply device (30) by one level if a predetermined concentration maintenance condition indicating that the carbon dioxide concentration of the inside air is maintained is satisfied, even if the concentration increase condition is not satisfied. That is, the controller (55) increases the gas supply mode of the gas supply device (30) by one level. Note that the concentration maintenance condition is "CO$_{2\_1hr\ average\ n}$, which is a moving average obtained through 60 calculations of a one-minute average of the carbon dioxide concentration of the air in the container (11) measured by the carbon dioxide sensor (52) every four seconds is equal to CO$_{2\_1hr\ average\ n-1}$, which is a moving average obtained last time through 60 calculations of a one-minute average of the carbon dioxide concentration of the inside air measured by the carbon dioxide sensor (52) every four seconds (CO$_{2\_1hr\ average\ n}$=CO$_{2\_1hr\ average\ n-1}$)."

Specifically, when the current concentration CO$_2$ is within the concentration range I (CO$_2$>$Y_2$>$A_{max}$), i.e., when the current concentration CO$_2$ significantly exceeds the reference concentration range A, the controller (55) performs the increasing control for increasing the amount of gas supply to the container (11) to increase the amount of the inside air exhausted, thereby lowering the carbon dioxide concentration of the inside air or its increasing rate, even if the carbon dioxide concentration of the inside air tends to increase, or is maintained (CO$_{2\_1hr\ average\ n}$≥CO$_{2\_1hr\ average\ n-1}$).

On the other hand, when the current concentration CO$_2$ is lower than the lower limit $A_{min}$ of the reference concentration range A, i.e., when the current concentration CO$_2$ is within the concentration range III or IV (CO$_2$<$A_{min}$), the controller (55) performs the reducing control for reducing the amount of gas supply from the gas supply device (30) by one level if a predetermined concentration decrease condition indicating the decrease in the carbon dioxide concentration of the inside air is satisfied. That is, the controller (55) lowers the gas supply mode of the gas supply device (30) by one level. Note that the concentration decrease condition is "CO$_{2\_1hr\ average\ n}$, which is a moving average obtained through 60 calculations of a one-minute average of the carbon dioxide concentration of the inside air measured by the carbon dioxide sensor (52) every four seconds is smaller than CO$_{2\_1hr\ average\ n-1}$, which is a moving average obtained last time through 60 calculations of a one-minute average of the carbon dioxide concentration of the inside air measured by the carbon dioxide sensor (52) every four seconds (CO$_{2\_1hr\ average\ n}$<CO$_{2\_1hr\ average\ n-1}$)."

Specifically, if the concentration decrease condition is satisfied when the current concentration CO$_2$ is within the concentration range III or IV (CO$_2$<$A_{min}$), i.e., when the current concentration CO$_2$ falls below the reference concentration range A, the controller (55) performs the reducing control for reducing the amount of gas supplied to the container (11) to reduce the amount of the inside air exhausted, thereby increasing the carbon dioxide concentration of the inside air or lowering its decreasing rate.

When the current concentration CO$_2$ is lower than the second low concentration $Y_1$, i.e., when the current concentration CO$_2$ is within the concentration range IV (CO$_2$<$Y_1$), the controller (55) performs the reducing control for reducing the amount of gas supply from the gas supply device (30) by one level if the concentration maintenance condition (CO$_{2\_1hr\ average\ n}$=CO$_{2\_1hr\ average\ n-1}$) is satisfied, even if the concentration decrease condition ($CO_{2\_1hr\ average\ n} < CO_{2\_1hr\ average\ n-1}$) is not satisfied. That is, the controller (55) lowers the gas supply mode of the gas supply device (30) by one level.

Specifically, when the current concentration $CO_2$ is within the concentration range IV ($CO_2 < Y_2 < A_{max}$), i.e., when the current concentration $CO_2$ significantly falls below the reference concentration range A, the controller (55) performs the reducing control for reducing the amount of gas supply to the container (11) to reduce the amount of the inside air exhausted, thereby increasing the carbon dioxide concentration of the inside air or lowering its decreasing rate, even if the carbon dioxide concentration of the inside air tends to decrease, or is maintained ($CO_{2\_1hr\ average\ n} \leq CO_{2\_1hr\ average\ n-1}$).

As can be seen, condition 1 "$Y_2 < CO_2$, $CO_{2\_1hr\ average\ n} \geq CO_{2\_1hr\ average\ n-1}$," i.e., the current concentration $CO_2$ is within the concentration range I and the concentration increase condition or the concentration maintenance condition is satisfied, and condition 2 "$A_{max} < CO_2 \leq Y_2$, $CO_{2\_1hr\ average\ n} > CO_{2\_1hr\ average\ n-1}$," i.e., the current concentration $CO_2$ is within the concentration range II and the concentration increase condition is satisfied, are the increasing conditions for the controller (55) to perform the increasing control. On the other hand, condition 3 "$Y_1 \leq CO_2 < A_{min}$, $CO_{2\_1hr\ average\ n} < CO_{2\_1hr\ average\ n-1}$," i.e., the current concentration $CO_2$ is within the concentration range III and the concentration decrease condition is satisfied, and condition 4 "$C0_2 < Y_2$, $CO_{2\_1hr\ average\ n} < CO_{2\_1hr\ average\ n-1}$," i.e., the current concentration $CO_2$ is within the concentration range IV and the concentration decrease condition or the concentration maintenance condition is satisfied, are the reducing conditions for the controller (55) to perform the reducing control.

<<Control Flow>>

Next, how the controller (55) performs control in the carbon dioxide concentration controlling operation will be described with reference to FIG. 14.

As described above, determining to give priority to carbon dioxide through the priority determination, the controller (55) confirms that the current carbon dioxide concentration (current concentration $CO_2$) of the inside air is higher than a predetermined lower limit concentration $C_{min}$ (e.g., 5%) ($CO_2 > C_{min}$) due to introduction of carbon dioxide into the container (11) before the start of the operation, and starts the carbon dioxide concentration controlling operation.

In the carbon dioxide concentration controlling operation, the controller (55) first obtains, from the initial concentration C0 which is the carbon dioxide concentration of the inside air at the start of the operation, the reference concentration range A as the control target of the increasing control and the reducing control, and thresholds (the second low concentration $Y_1$ and the second high concentration $Y_2$) used in the increasing control and the reducing control. Then, the controller (55) causes the gas supply device (30) to start the gas supply operation in the thirteenth gas supply mode (t=9 seconds), and opens the exhaust valve (46b) of the exhaust portion (46) (step S1). Through this gas supply operation, the low oxygen concentration air is supplied into the container (11), and the inside air in an amount corresponding to the supply amount of the low oxygen concentration air is exhausted out of the container (11) through the exhaust passage (46a) of the exhaust portion (46). Then, the air present in the container (11) is gradually replaced with the low oxygen concentration air supplied by the gas supply device (30), and as a result, the oxygen concentration of the air in the container (11) is gradually lowered.

Next, the controller (55) determines whether or not the above-described increasing conditions (conditions 1 and 2) are satisfied (step S2). If the answer is "YES" in step S2, the flow proceeds to step S3, and the controller (55) determines whether the gas supply device (30) is in operation in the fifteenth gas supply mode in which the amount of gas supply is the maximum (the oxygen concentration: 8%). The flow returns to step S2 if the controller (55) selects "YES" in step S3, and proceeds to step S4 if "NO" is selected in step S3. In step S4, the controller (55) increases the gas supply mode of the gas supply device (30) by one level to increase the amount of gas supply by one level, and the flow returns to step S2.

On the other hand, if the answer is "NO" in step S2, the flow proceeds to step S5, and the controller (55) determines whether or not the above-described reducing conditions (conditions 3 and 4) are satisfied (step S5). If the answer is "YES" in step S5, the flow proceeds to step S6, and the controller (55) determines whether the gas supply device (30) is in operation in the first gas supply mode in which the amount of gas supply is the minimum (the oxygen concentration: 3%). If the answer is "NO" in step S6, the flow proceeds to step S7, and the controller (55) lowers the gas supply mode of the gas supply device (30) by one level to reduce the amount of gas supply by one level. Then, the flow returns to step S2.

If the answer is "YES" in step S6, the flow proceeds to step S8, and the controller (55) determines whether or not the exhaust valve (46b) of the exhaust portion (46) is open. If the answer is "YES" in step S8, the flow proceeds to step S9, and the controller (55) closes the exhaust valve (46b) of the exhaust portion (46). Then, the flow returns to step S2.

On the other hand, if the answer is "NO" in step S8, the flow proceeds to step S10, and the controller (55) determines whether a predetermined stop condition is satisfied or not. In the present embodiment, the controller (55) determines that the stop condition is satisfied if either one of a condition that the increasing control and the reducing control have never been performed after the start of the operation, or a condition that an hour or more has passed after the increasing control or the reducing control is satisfied.

If the answer is "NO" in step S10, the flow returns to step S2. If the answer is "YES" in step S10, the flow proceeds to step S11, and the controller (55) stops the gas supply operation by the gas supply device (30). Note that the gas supply device (30) is not completely stopped at this time, but is in a standby state so that the gas supply device (30) can be activated immediately upon receiving a command from the controller (55).

The flow proceeds from step S11 to step S12, and the controller (55) determines whether or not a predetermined recovery condition indicating the increase in the carbon dioxide concentration of the inside air through the breathing of the plants (15) is satisfied while the gas supply operation is stopped. In the present embodiment, the controller (55) determines that the recovery condition is satisfied if a condition indicating that the current carbon dioxide concentration (the current concentration $CO_2$) of the inside air keeps exceeding the lower limit $A_{min}$ (=C0+α) of the reference concentration range A consecutively for ten minutes is satisfied, or a condition indicating that $CO_{2\_average}$, which is a moving average obtained through 10 calculations of a one-minute average of the carbon dioxide concentration of the inside air measured by the carbon dioxide sensor (52) every four seconds, is greater than the lower limit value $A_{min}$ (=C0+α) of the reference concentration range A is satisfied. That is, the recovery condition is a condition indicating that the carbon dioxide concentration of the inside air that was below the reference concentration range A has recovered to fall within the reference concentration range A.

If the answer is "NO" in step S12, the flow repeats step S12. If the answer is "YES" in step S12, the flow returns to step S1, and the controller (55) causes the gas supply device (30) to resume the gas supply operation.

As can be seen, the controller (55) causes the gas supply device (30) to perform the gas supply operation, while increasing or reducing the amount of gas supply in accordance with the carbon dioxide concentration of the inside air such that the carbon dioxide concentration of the inside air falls within the reference concentration range A, thereby lowering the oxygen concentration of the inside air to the target oxygen concentration. In the carbon dioxide concentration controlling operation, the controller (55) controls the carbon dioxide concentration of the inside air not to reach the target carbon dioxide concentration $SPCO_2$, but to fall within the predetermined reference concentration range A that is set in accordance with the initial concentration C0 at the start of the operation. Thus, even if an amount of carbon dioxide in the container before the start of the operation is insufficient, a control target concentration range (reference concentration range A) is set in accordance with the initial concentration C0 at the start of the operation, and the carbon dioxide concentration of the inside air is controlled to be in the desired composition.

<<Update Control Through Gas Introduction>>

The inside air control apparatus (60) may be activated (turned on) not after, but before or during, the introduction of carbon oxide (gas introduction) into the container (11). As described above, when the inside air control apparatus (60) is activated before or during the gas introduction, a relatively low carbon dioxide concentration before or during the increase is measured as the initial concentration C0, and as a result, the reference concentration range A in accordance with the initial concentration C0 is also set to be lower than that when the inside air control apparatus (60) is activated after the gas introduction. If the reference concentration range A is set to be lower than the concentration range to be originally set, the carbon dioxide concentration is not maintained at, but controlled to be lower than, the concentration at the end of the gas introduction, even if a sufficient amount of carbon dioxide is introduced into the container (11).

Therefore, in the present embodiment, in a case in which the inside air control apparatus is activated (turned on) before or during the gas introduction and the gas introduction ends thereafter, update control for updating the setting of the reference concentration range A after the gas introduction is executed.

Figure 14:
FIG. 14 is a control flow of the carbon dioxide concentration controlling operation of the first embodiment.
Figure 15:
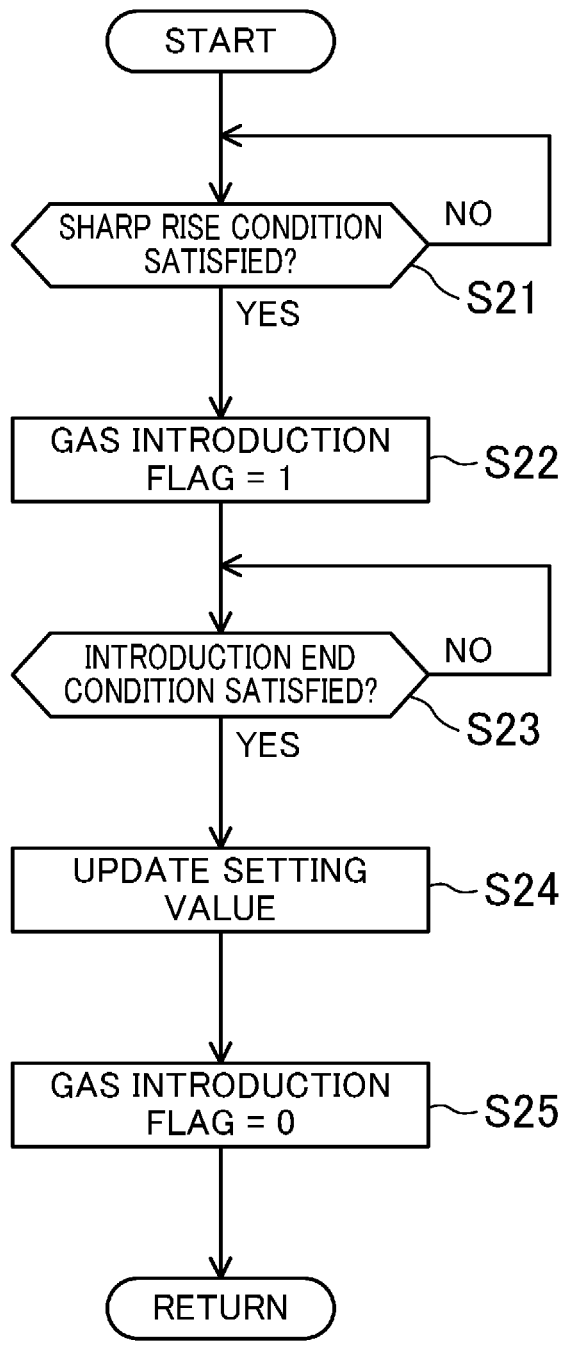
FIG. 15 is a control flow of update control through gas introduction in the carbon dioxide concentration controlling operation of the first embodiment.

More specifically, the controller (55) performs the update control shown in FIG. 15 in parallel with the control illustrated in FIG. 14. In the update control, the controller (55) first determines whether or not a sharp rise condition is satisfied (step S21). In the present embodiment, the controller (55) determines that the sharp rise condition is satisfied if $CO_{2\_average}$, which is a one-minute average of the carbon dioxide concentration of the inside air measured by the carbon dioxide sensor (52), is greater by 0.5% or more than $CO_{2\_average}$, which is a one-minute average of the carbon dioxide concentration of the inside air measured five minutes ago by the carbon dioxide sensor (52) ((current $CO_{2\_average}$−$CO_{2\_average}$ five minutes ago)≥0.5%).

If the answer is "NO" in step S21, the controller (55) repeats the determination in step S21. If the answer is "YES" in step S21, the flow proceeds to step S22, and the controller (55) determines that the gas introduction is being performed, and sets a gas introduction flag to "1."

Next, the flow proceeds to step S23, and the controller (55) determines whether a predetermined introduction end condition is satisfied or not. In the present embodiment, the controller (55) determines that the introduction end condition is satisfied if $CO_{2\_average}$, which is the one-minute average of the carbon dioxide concentration of the inside air measured by the carbon dioxide sensor (52), is not higher by 0.5% or more than the one-minute average $CO_{2\_average}$ of the carbon dioxide concentration of the inside air measured by the carbon dioxide sensor (2) five minutes ago ((the current $CO_{2\_average}$− the $CO_{2\_average}$ five minutes ago)<+0.5%).

If the answer is "NO" in step S23, the controller (55) repeats the determination in step S23. On the other hand, if the answer is "YES" in step S23, the flow proceeds to step S24, and the controller (55) updates the setting of the reference concentration range A. Specifically, the starting concentration C1 is updated taking the current carbon dioxide concentration of the inside air as the initial concentration C0, and the setting of the reference concentration range A is updated.

Then, after the setting of the reference concentration range A is updated, the flow proceeds to step S25, in which the controller (55) sets the gas introduction flag to "0," and returns to step S21.

As described above, through the update control by the controller (55), the starting concentration C1 is updated taking the carbon dioxide concentration of the inside air after the gas introduction as the initial concentration C0, and the setting of the reference concentration range A is updated, even if the inside air control apparatus (60) is activated (turned on) before or during the gas introduction. As a result, in the carbon dioxide concentration controlling operation, the carbon dioxide concentration of the inside air is maintained at the carbon dioxide concentration at the end of the gas introduction.

In the present embodiment, in a period from when the gas introduction flag is set to "1" in step S22 to when the gas introduction flag is set to "0" in step S25 in the update control, the controller (55) is configured not to perform the increasing control even if the increasing condition is satisfied in the carbon dioxide concentration controlling operation because the gas is being introduced.

<<Update Control when Concentration Decreases after Gas Introduction>>

After the introduction of carbon dioxide (gas introduction) into the container (11) ends, the introduced carbon dioxide flows into cargo boxes, and the inside air is stirred. As a result, the carbon dioxide concentration of the inside air is stabilized at a level lower than the concentration at the end of the gas introduction. If the carbon dioxide concentration controlling operation is started at the end of the gas introduction, the reference concentration range A is set to be high, taking the carbon dioxide concentration higher than the carbon dioxide concentration that is once lowered and stabilized after the gas introduction as the initial concentration C0.

Therefore, in the present embodiment, in a case in which the carbon dioxide concentration of the inside air is stabilized at a lower concentration than that at the start of the operation, the update control for updating the setting of the reference concentration range A is executed.

More specifically, the controller (55) performs the update control shown in FIG. 16 in parallel with the control illustrated in FIG. 14. In the update control, the controller

(55) first determines whether or not a predetermined lowered concentration maintenance condition indicating that the carbon dioxide concentration of the inside air that has increased through the introduction of carbon dioxide (gas introduction) into the container (11) is lowered is satisfied (step S31). In the present embodiment, the controller (55) determines that the lowered concentration maintenance condition is satisfied if the initial concentration C0 is higher than the first low concentration (X+α) and the carbon dioxide concentration of the inside air is kept equal to or lower than a lowered concentration which is lower than the starting concentration C1 by a predetermined concentration (e.g., 1.0%) ($CO_2 \leq C1-1.0\%$) for a predetermined time (e.g., an hour) or more.

If the answer is "NO" in step S31, the controller (55) repeats the determination in step S31. On the other hand, if the answer is "YES" in step S31, the flow proceeds to step S32, and the controller (55) updates the setting of the reference concentration range A. Specifically, the starting concentration C1 is updated taking the current carbon dioxide concentration of the inside air as the initial concentration C0, and the setting of the reference concentration range A is updated. Then, after the setting of the reference concentration range A is updated by the controller (55), the flow proceeds to step S21.

As described above, through the update control by the controller (55), the starting concentration C1 is updated taking the carbon dioxide concentration of the inside air at the time when the carbon dioxide concentration is stabilized as the initial concentration C0, and the setting of the reference concentration range A is updated, even if the carbon dioxide concentration of the inside air is stabilized after the gas introduction at a level lower than the carbon dioxide concentration at the end of the gas introduction. As a result, in the carbon dioxide concentration controlling operation, the carbon dioxide concentration of the inside air is maintained at the carbon dioxide concentration that was once lowered and then stabilized after the gas introduction.

<<Operation Change Control when No Gas is Introduced>>

If the container (11) is loaded with plants (15), such as blueberries and asparaguses, which are preferably stored in an environment with a low oxygen concentration and a relatively high carbon dioxide concentration to keep them fresh, the carbon dioxide concentration controlling operation is performed to control the composition of the inside air to create an environment suitable for keeping the plants (15) fresh. For this purpose, the carbon dioxide concentration controlling operation is assumed to start in a situation in which carbon dioxide is introduced into the container (11) in advance to increase the carbon dioxide concentration of the inside air to some extent.

However, even in a situation where carbon dioxide is not introduced into the container (11), the controller (55) determines to give priority to carbon dioxide through the priority determination if the target carbon dioxide concentration $SPCO_2$ is high, and attempts to start the carbon dioxide concentration controlling operation. Even if the carbon dioxide concentration controlling operation is performed in such a state in which the carbon dioxide concentration of the inside air is low, the gas supply operation is immediately stopped, and the oxygen concentration of the inside air cannot be lowered.

Therefore, in the present embodiment, the controller (55) is configured to switch the operation of the inside air control apparatus (60) from the carbon dioxide concentration controlling operation to the oxygen concentration lowering operation if the carbon dioxide concentration of the inside air is equal to or lower than a predetermined lower limit concentration $C_{min}$ (e.g., 5%) at the start of the carbon dioxide concentration controlling operation. With such a configuration, if no gas introduction is performed and the carbon dioxide concentration of the inside air is low at the start of the carbon dioxide concentration controlling operation, the operation is switched to the oxygen concentration lowering operation, and the gas supply operation is reliably performed. Then, if the carbon dioxide concentration $SPCO_2$ of the inside air continues to be equal to or higher than the lower limit concentration $C_{min}$ for a predetermined time (e.g., 10 minutes) or more before the oxygen concentration of the inside air is lowered to the target oxygen concentration $SPO_2$ after the switching to the oxygen concentration lowering operation, the controller (55) returns the operation of the inside air control apparatus (60) from the oxygen concentration lowering operation to the carbon dioxide concentration controlling operation. Thus, if the carbon dioxide concentration of the inside air is increased to some extent through the gas introduction or the breathing of the plants (15) while the gas supply operation is performed after the switching to the oxygen concentration lowering operation, the oxygen concentration lowering operation is switched to the carbon dioxide concentration controlling operation. Through the switching of the operation as described above, a situation in which the oxygen concentration of the inside air cannot be lowered due to the absence of the gas supply operation can be kept from lasting for a long time.

Advantages of First Embodiment

As can be seen, the controller (55) of the first embodiment is configured to be able to execute, if the oxygen concentration of the inside air is higher than the target oxygen concentration $SPO_2$, the carbon dioxide concentration controlling operation for controlling the composition of the inside air to be the desired composition by causing the gas supply device (30) to perform the gas supply operation for supplying the low oxygen concentration air that is produced through the reduction of oxygen from the outside air and has a lower oxygen concentration than the outside air into the container (11), while allowing the gas supply device (30) to change the amount of gas supply such that the carbon dioxide concentration of the inside air falls within the predetermined reference concentration range.

As described above, when the gas supply device (30) supplies the low oxygen concentration air into the container (11), the inside air is pushed out of the container by the amount of the gas supply. Therefore, if the amount of gas supply from the gas supply device (30) increases, the amount of gas exhausted from the container also increases. Conversely, if the amount of gas supply from the gas supply device (30) decreases, the amount of gas exhausted from the container also decreases. The low oxygen concentration air supplied into the storage (11) through the gas supply operation is produced through the reduction of oxygen from the outside air. Thus, the carbon dioxide concentration of the low oxygen concentration air is equal to the carbon dioxide concentration (0.03%) of the outside air. On the other hand, the inside air exhausted out of the container (11) has a higher carbon dioxide concentration than the outside air due to carbon dioxide introduced in advance into the container or the breathing of the plants (15). Therefore, if the amount of gas supply from the gas supply device (30) increases to increase the amount of gas exhausted from the container, the carbon dioxide concentration of the inside air decreases. Conversely, if the amount of gas supply from the gas supply device (30) is reduced to reduce the amount gas exhausted from the container, the carbon dioxide concentration of the inside air increases.

Therefore, in the first embodiment, once the carbon dioxide concentration controlling operation is started, the gas supply operation never fails to start, unlike in the conventional apparatus, even if the amount of carbon dioxide in the container is insufficient before the start of the operation. This can lower the oxygen concentration of the inside air, and can control the carbon dioxide concentration of the inside air to fall within the desired reference concentration range A through the gas supply operation performed by the gas supply device (30), while changing the amount of gas supply.

Further, according to the first embodiment, in the carbon dioxide concentration controlling operation, the carbon dioxide concentration of the inside air is controlled not to reach the target carbon dioxide concentration $SPCO_2$, but to fall within the predetermined reference concentration range A which is set in accordance with the initial concentration C0 at the start of the operation. Therefore, even if the amount of carbon dioxide in the container before the start of the operation is insufficient, the control target concentration range is set in accordance with the carbon dioxide concentration of the inside air at the start of the operation. This can keep the gas supply operation from failing to start, unlike in the conventional apparatus, and can control the carbon dioxide concentration of the inside air to be in the desired composition.

Further, according to the first embodiment, if the initial concentration C0 of the carbon dioxide concentration of the inside air falls within a concentration range which is higher than the predetermined allowable concentration X and includes the target carbon dioxide concentration $SPCO_2$, the reference concentration range A is set to have the initial concentration C0 as a lower limit. If the initial concentration C0 of the carbon dioxide concentration of the inside air falls within a relatively low concentration range including the allowable concentration X, the reference concentration range A is set to have the first low concentration (X+α) which is higher than the allowable concentration X by the predetermined concentration α as a lower limit. If the initial concentration C0 of the carbon dioxide concentration of the inside air falls within a relatively high concentration range higher than the target carbon dioxide concentration $SPCO_2$, the reference concentration range A is set to have the first high concentration ($SPCO_2$+α) which is higher than the target carbon dioxide concentration $SPCO_2$ by the predetermined concentration α as a lower limit. Setting the reference concentration range A in this way makes the following control. Specifically, the carbon dioxide concentration of the inside air is maintained at: the initial concentration C0 if the initial concentration C0 falls within a concentration range higher than the allowable concentration X and including the target carbon dioxide concentration $SPCO_2$; the allowable concentration X if the initial concentration C0 falls within a low concentration range including the allowable concentration X; and the target carbon dioxide concentration $SPCO_2$ if the initial concentration C0 falls within a high concentration range higher than the target carbon dioxide concentration $SPCO_2$. Therefore, in the carbon dioxide concentration controlling operation, the control target concentration range (reference concentration range A) is set to include the initial concentration C0 of the carbon dioxide concentration of the inside air, or set to be a reasonable range close to the initial concentration C0, in accordance with the initial concentration C0 of the carbon dioxide concentration of the inside air. This can control the carbon dioxide concentration of the inside air to be in the desired composition without failing to start the gas supply operation unlike in the conventional apparatus.

According to the first embodiment, in the carbon dioxide concentration controlling operation, if the carbon dioxide concentration of the inside air falls below the reference concentration range A and tends to decrease, the amount of gas supply from the gas supply device (30) is reduced by one level. This reduces the amount of the inside air exhausted, which can increase the carbon dioxide concentration of the inside air, or can lower its decreasing rate. On the other hand, if the carbon dioxide concentration of the inside air is higher than the reference concentration range A and tends to increase, the amount of gas supply from the gas supply device (30) is increased by one level. This increases the amount of the inside air exhausted, which can lower the carbon dioxide concentration of the inside air or its increasing rate.

Moreover, according to the first embodiment, in the carbon dioxide concentration controlling operation, if the carbon dioxide concentration of the inside air is lower than the second low concentration $Y_1$ that falls below the reference concentration range A, the amount of gas supply from the gas supply device (30) is reduced by one level as long as the carbon dioxide concentration of the inside air is maintained at that concentration, even if it does not tend to decrease. That is, if the carbon dioxide concentration of the inside air significantly falls below the reference concentration range A, the amount of gas supply from the gas supply device (30) is reduced by one level as long as the carbon dioxide concentration of the inside air is maintained at that concentration, even if it does not tend to decrease. This reduces the amount of the inside air exhausted, which can increase the carbon dioxide concentration of the inside air, or can lower its decreasing rate. On the other hand, if the carbon dioxide concentration of the inside air is higher than the second high concentration $Y_2$ which exceeds the reference concentration range A, the amount of gas supply from the gas supply device (30) is increased by one level as long as the carbon dioxide concentration of the inside air is maintained at that concentration, even if it does not tend to increase. That is, if the carbon dioxide concentration of the inside air significantly exceeds the reference concentration range A, the amount of gas supply from the gas supply device (30) is increased by one level as long as the carbon dioxide concentration of the inside air is maintained at that concentration, even if it does not tend to increase. This increases the amount of the inside air exhausted, which can lower the carbon dioxide concentration of the inside air or its increasing rate.

Further, according to the first embodiment, in the carbon dioxide concentration controlling operation, if the amount of gas supply from the gas supply device (30) is the minimum when the carbon dioxide concentration of the inside air falls below the reference concentration range A and the reducing condition for performing the reducing control in which the amount of gas supply from the gas supply device (30) is reduced by one level is satisfied, the amount of gas supply from the gas supply device (30) cannot be reduced any more. Thus, the exhaust valve (46b) is closed not to exhaust the inside air, so that the carbon dioxide concentration of the inside air can be increased, or its decreasing rate can be lowered.

Moreover, according to the first embodiment, in the carbon dioxide concentration controlling operation, if the amount of gas supply from the gas supply device (30) is the minimum and the exhaust valve (46b) is closed to exhaust no inside air when the carbon dioxide concentration of the inside air falls below the reference concentration range A and the reducing condition for performing the reducing control in which the amount of gas supply from the gas supply device (30) is reduced by one level is satisfied, the carbon dioxide concentration of the inside air keeps decreasing if the gas supply operation continues. Thus, the gas supply operation is stopped so that the carbon dioxide concentration of the inside air can be increased through the breathing of the plants (15).

In addition, according to the first embodiment, in the carbon dioxide concentration controlling operation, if the carbon dioxide concentration of the inside air falls below the reference concentration range A and the gas supply operation is stopped, and thereafter, the carbon dioxide concentration of the inside air is increased through the breathing of the plants (15) and a predetermined recovery condition is satisfied, the gas supply operation is resumed. If the gas supply operation is resumed after the recovery of the carbon dioxide concentration of the inside air, the oxygen concentration can be lowered to the target oxygen concentration while keeping the carbon dioxide concentration of the inside air from significantly decreasing.

If the inside air control apparatus (60) is activated before or during the gas introduction, a relatively low carbon dioxide concentration before or during the increase is measured as the initial concentration C0. As a result, the reference concentration range A in accordance with the initial concentration C0 is also set to be lower than that when the inside air control apparatus (60) is activated after the gas introduction. If the reference concentration range A is set to be lower than the concentration range to be originally set, the carbon dioxide concentration is not maintained at, but controlled to be lower than, the concentration at the end of the gas introduction, even if a sufficient amount of carbon dioxide is introduced into the container (11).

However, in the first embodiment, even if the inside air control apparatus (60) is activated before or during the gas introduction, the reference concentration range A is updated taking the carbon dioxide concentration of the inside air after the gas introduction as the initial concentration C0. Thus, in the carbon dioxide concentration controlling operation, the carbon dioxide concentration of the inside air can be controlled not to reach the relatively low carbon dioxide concentration before or during the gas introduction, but to be maintained at the carbon dioxide concentration at the end of the gas introduction.

After the introduction of carbon dioxide (gas introduction) into the container (11) ends, the introduced carbon dioxide flows into cargo boxes, and the inside air is stirred. As a result, the carbon dioxide concentration of the inside air is stabilized at a level lower than the concentration at the end of the gas introduction. If the carbon dioxide concentration controlling operation is started at the end of the gas introduction, the reference concentration range A is set to be high, taking the carbon dioxide concentration higher than the carbon dioxide concentration that is once lowered and stabilized after the gas introduction as the initial concentration C0.

However, in the first embodiment, even if the carbon dioxide concentration of the inside air is stabilized after the gas introduction at a level lower than the carbon dioxide concentration at the end of the gas introduction, the reference concentration range A is updated taking the carbon dioxide concentration of the inside air at the time when the carbon dioxide concentration is stabilized as the initial concentration C0. Thus, in the carbon dioxide concentration controlling operation, control of the carbon dioxide concentration of the inside air can be made to maintain, not the relatively high carbon dioxide concentration at the end of the gas introduction, but the carbon dioxide concentration that is once lowered and stabilized.

The controller (55) may start the carbon dioxide concentration controlling operation in a situation in which no carbon dioxide is introduced into the container (11). Even if the carbon dioxide concentration controlling operation is performed in such a state in which the carbon dioxide concentration of the inside air is low, the amount of gas supply immediately decreases to the minimum, or the gas supply operation is immediately stopped, and the oxygen concentration of the inside air cannot be lowered.

However, according to the first embodiment, if the carbon dioxide concentration of the inside air is equal to or lower than the predetermined lower limit concentration $C_{min}$ at the start of the carbon dioxide concentration controlling operation, the operating mode of the inside air control apparatus is switched from the carbon dioxide concentration controlling operation to the oxygen concentration lowering operation in which the gas supply device (30) is caused to continuously perform the gas supply operation until the oxygen concentration of the inside air decreases to the target oxygen concentration $SPO_2$. With such a configuration, if no gas introduction is performed and the carbon dioxide concentration of the inside air is low at the start of the carbon dioxide concentration controlling operation, the operation is switched to the oxygen concentration lowering operation, and the gas supply operation is reliably performed. Then, if the carbon dioxide concentration of the inside air continues to be equal to or higher than the lower limit concentration $C_{min}$ for a predetermined time or more before the oxygen concentration of the inside air is lowered to the target oxygen concentration $SPO_2$ after the switching to the oxygen concentration lowering operation, the controller (55) returns the operation of the inside air control apparatus (60) from the oxygen concentration lowering operation to the carbon dioxide concentration controlling operation. Thus, if the carbon dioxide concentration of the inside air is increased to some extent through the gas introduction or the breathing of the plants (15) while the gas supply operation is performed after the switching to the oxygen concentration lowering operation, the oxygen concentration lowering operation is switched to the carbon dioxide concentration controlling operation. Through the switching of the operation as described above, a situation in which the oxygen concentration of the inside air cannot be lowered due to the absence of the gas supply operation can be kept from lasting for a long time.

According to the first embodiment, in the container refrigeration apparatus (10) including the inside air control apparatus (60) that controls the composition of the air in the container (11) storing the plants (15), the inside air can be controlled to have desired composition even if the carbon dioxide concentration of the inside air is low at the start of the operation.

OTHER EMBODIMENTS

The target oxygen concentration $SPO_2$ and the target carbon dioxide concentration $SPCO_2$ mentioned in the embodiment are merely examples, and are not limited to the values described above.

Further, the priority determination described in the embodiment is not limited to the one described above, and can be any kind of determination as long as it can detect a status in which priority should be given to carbon dioxide or oxygen.

The allowable concentration, the first low concentration, the first high concentration, and the lower limit concentration described in the embodiment are merely examples, and are not limited to the concentrations described in the embodiment.

Further, the method for obtaining the reference concentration range which is set in accordance with the initial concentration, the second low concentration, and the second high concentration described in the embodiment are not limited to the method described in the embodiment.

In the embodiment, the low oxygen concentration air has been produced in the gas supply device (30) using an adsorbent that adsorbs a nitrogen component in a compressed state. Alternatively, the low oxygen concentration air may be produced using activated carbon adsorbing an oxygen component as the adsorbent.

In addition, according to the embodiment, the inside air control apparatus (60) has been applied to the container refrigeration apparatus (10) provided for the container (11) for use in marine transportation. However, the inside air control apparatus (60) of the present invention is not limited to such applications. The inside air control apparatus (60) may be used to control the composition of the air in, not only a container for use in marine transportation, but also a container for use in land transportation, a simple refrigerated storage, a normal temperature storage, or any other suitable storage, for example.

While the embodiments and variations thereof have been described above, it will be understood that various changes in form and details may be made without departing from the spirit and scope of the claims. The embodiments and the variations thereof may be combined and replaced with each other without deteriorating intended functions of the present disclosure.

INDUSTRIAL APPLICABILITY

As can be seen in the foregoing, the present disclosure is useful for an inside air control apparatus and a container refrigeration apparatus including the same.

DESCRIPTION OF REFERENCE CHARACTERS

10 Container Refrigeration Apparatus
11 Container (Storage)
15 Plant
20 Refrigerant Circuit
30 Gas Supply Device
46 Exhaust Portion
46a Exhaust Passage
46b Exhaust Valve
55 Controller
60 Inside Air Control Apparatus (Controlled Atmosphere System)
$SPO_2$ Target Oxygen Concentration
$SPCO_2$ Target Carbon Dioxide Concentration
C0 Initial Concentration
C1 Starting Concentration
A Reference Concentration Range
$A_{max}$ Upper Limit of Reference Concentration Range
$A_{min}$ Lower Limit of Reference Concentration Range
X Allowable Concentration
X+α First Low Concentration
$SPCO_2$+a First High Concentration
$Y_1$ Second Low Concentration
$Y_2$ Second High Concentration
$C_{min}$ Lower Limit Concentration

The invention claimed is:

1. An inside air control apparatus, comprising:
a gas supply circuitry that performs a gas supply operation for supplying air that is produced through reduction of oxygen from outside air and has a lower oxygen concentration than the outside air into a storage storing breathing plants, the gas supply circuitry including:
at least one adsorption column provided with an adsorbent that adsorbs a nitrogen component in a pressurized state, and desorbs the nitrogen component in a depressurized state,
a first pump supplying pressurized outside air to the at least one adsorption column,
a second pump sucking air from the at least one adsorption column to produce the air having a lower oxygen concentration than the outside air and supplying the air that is produced into the storage, and
a switching valve switching between the gas supply operation for supplying the produced air into the storage by the second pump and a gas exhaust operation for exhausting the produced air outside the storage without going through the storage by the second pump; and
a controller that controls an operation of the gas supply circuitry such that inside air of the storage has desired composition, wherein
the gas supply circuitry is configured to be able to change an amount of gas supply into the storage through the gas supply operation in a plurality of stages by changing time for the gas exhaust operation and to decrease an oxygen concentration of the air supplied into the storage with a decrease in the amount of gas supply, and
the controller is configured to be able to execute, if the oxygen concentration of the inside air is higher than a target oxygen concentration, a carbon dioxide concentration controlling operation for lowering an oxygen concentration of the inside air to the target oxygen concentration by causing the gas supply circuitry to perform the gas supply operation, while allowing the gas supply circuitry to change the amount of gas supply in accordance with a carbon dioxide concentration of the inside air such that the carbon dioxide concentration of the inside air falls within a reference concentration range.

2. The inside air control apparatus of claim 1, wherein the controller is configured to change the reference concentration range in accordance with an initial concentration which is a carbon dioxide concentration of the inside air at the start of the carbon dioxide concentration controlling operation.

3. The inside air control apparatus of claim 2, wherein the reference concentration range is:
a range having the initial concentration as a lower limit if the initial concentration is equal to or higher than a first low concentration which is lower than a target carbon dioxide concentration and higher than a predetermined allowable concentration by a predetermined concentration, and is equal to or lower than a first high concentration which is higher than the target carbon dioxide concentration by the predetermined concentration;

a range having the first low concentration as the lower limit if the initial concentration is lower than the first low concentration; and a range having the first high concentration as the lower limit if the initial concentration is higher than the first high concentration.

4. The inside air control apparatus of claim 3, wherein the controller is configured to, in the carbon dioxide concentration controlling operation, perform reducing control for reducing the amount of gas supply from the gas supply circuitry by one level if a predetermined concentration decrease condition indicating a decrease in the carbon dioxide concentration of the inside air is satisfied when the carbon dioxide concentration of the inside air falls below the reference concentration range, and perform increasing control for increasing the amount of gas supply from the gas supply circuitry by one level if a predetermined concentration increase condition indicating an increase in the carbon dioxide concentration of the inside air is satisfied when the carbon dioxide concentration of the inside air exceeds the reference concentration range.

5. The inside air control apparatus of claim 4, wherein the controller is configured to, in the carbon dioxide concentration controlling operation, perform the reducing control if a predetermined concentration maintenance condition indicating that the carbon dioxide concentration of the inside air is maintained is satisfied, even if the concentration decrease condition is not satisfied, when the carbon dioxide concentration of the inside air is lower than a minimum threshold concentration that falls below the reference concentration range, and perform the increasing control if the concentration maintenance condition is satisfied, even if the concentration increase condition is not satisfied, when the carbon dioxide concentration of the inside air is higher than a maximum threshold concentration that exceeds the reference concentration range.

6. The inside air control apparatus of claim 5, further comprising:

an exhaust portion having an exhaust passage connecting an inside and outside of the storage, and an exhaust valve connected to the exhaust passage, wherein the controller is configured to, in the carbon dioxide concentration controlling operation, close the exhaust valve if the amount of gas supply from the gas supply circuitry is the minimum when a reducing condition for performing the reducing control is satisfied.

7. The inside air control apparatus of claim 6, wherein in the carbon dioxide concentration controlling operation, the controller stops the gas supply operation if the amount of gas supply from the gas supply circuitry is the minimum and the exhaust valve is closed when the reducing condition for performing the reducing control is satisfied.

8. The inside air control apparatus of claim 7, wherein the controller is configured to, in the carbon dioxide concentration controlling operation, resume the gas supply operation if the carbon dioxide concentration of the inside air has increased through the breathing of the plants while the gas supply operation is stopped, and a predetermined recovery condition is satisfied.

9. The inside air control apparatus of claim 3, wherein the controller is configured to, in the carbon dioxide concentration controlling operation, determine that carbon dioxide gas is being introduced into the storage if a predetermined sharp rise condition indicating a sharp rise in the carbon dioxide concentration of the inside air is satisfied, and to stand by until a predetermined introduction end condition indicating an end of the introduction of the gas is satisfied, and if the introduction end condition is satisfied, to update the reference concentration range taking the carbon dioxide concentration of the inside air at the time when the introduction end condition is satisfied as the initial concentration.

10. The inside air control apparatus of claim 3, wherein the controller is configured to, if the carbon dioxide concentration of the inside air has increased through the introduction of carbon oxide into the storage and then lowered to satisfy a predetermined lowered concentration maintenance condition in the carbon dioxide concentration controlling operation, update the reference concentration range taking the carbon dioxide concentration of the inside air at the time when the lowered concentration maintenance condition is satisfied as the initial concentration.

11. The inside air control apparatus of claim 3, wherein the controller is configured to switch an operating mode of the inside air control apparatus from the carbon dioxide concentration controlling operation to an oxygen concentration lowering operation in which the gas supply circuitry is caused to continuously perform the gas supply operation until the oxygen concentration of the inside air is lowered to the target oxygen concentration if the carbon dioxide concentration of the inside air at the start of the carbon dioxide concentration controlling operation is equal to or lower than a lower limit concentration $C_{min}$ which is lower than the first low concentration, and switch the operating mode of the inside air control apparatus from the oxygen concentration lowering operation to the carbon dioxide concentration controlling operation if the carbon dioxide concentration of the inside air continues to be equal to or higher than the lower limit concentration $C_{min}$ for a predetermined time or more in the oxygen concentration lowering operation before the oxygen concentration of the inside air is lowered to the target oxygen concentration.

12. A container refrigeration apparatus, comprising:

the inside air control apparatus of claim 1; and a refrigerant circuit that performs a refrigeration cycle, wherein the container refrigeration apparatus cools inside air of a container serving as the storage, and controls composition of the inside air.

* * * * *